US010717042B2

(12) United States Patent
Laporte et al.

(10) Patent No.: US 10,717,042 B2
(45) Date of Patent: Jul. 21, 2020

(54) METHOD FOR NO$_x$ UPTAKE USING A PARTICULATE EARTH ALKALI CARBONATE-COMPRISING MATERIAL AND/OR PARTICULATE EARTH ALKALI PHOSPHATE-COMPRISING MATERIAL

(71) Applicant: Omya International AG, Oftringen (CH)

(72) Inventors: Christophe Laporte, Romont (CH); Daniel Frey, Zofingen (CH); Kai Max Hettmann, Grenzach-Wyhlen (DE); Samuel Rentsch, Spiegel bei Bern (CH); Detlef Gysau, Full (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 32 days.

(21) Appl. No.: 16/071,389

(22) PCT Filed: Mar. 6, 2017

(86) PCT No.: PCT/EP2017/055178
§ 371 (c)(1),
(2) Date: Jul. 19, 2018

(87) PCT Pub. No.: WO2017/153329
PCT Pub. Date: Sep. 14, 2017

(65) Prior Publication Data
US 2020/0016531 A1   Jan. 16, 2020

Related U.S. Application Data

(60) Provisional application No. 62/307,603, filed on Mar. 14, 2016.

(51) Int. Cl.
*B01D 53/56* (2006.01)
*B01J 20/04* (2006.01)
*B01J 20/28* (2006.01)
*B01J 20/30* (2006.01)
*C02F 1/28* (2006.01)
*C02F 101/16* (2006.01)

(52) U.S. Cl.
CPC .......... *B01D 53/565* (2013.01); *B01J 20/043* (2013.01); *B01J 20/048* (2013.01); *B01J 20/28059* (2013.01); *B01J 20/28061* (2013.01); *B01J 20/3071* (2013.01); *C02F 1/281* (2013.01); *B01D 2251/404* (2013.01); *B01D 2251/604* (2013.01); *B01D 2251/606* (2013.01); *B01D 2251/61* (2013.01); *B01D 2253/306* (2013.01); *B01D 2257/402* (2013.01); *B01D 2257/404* (2013.01); *C02F 2101/163* (2013.01); *C02F 2101/166* (2013.01)

(58) Field of Classification Search
CPC .. B01D 53/56; B01D 53/565; B01D 53/9409; B01D 53/9413; B01D 2251/606; B01D 2251/61; B01D 2257/402; B01D 2257/404; B01J 20/043; B01J 20/048; B01J 2208/00805
See application file for complete search history.

(56) References Cited

U.S. PATENT DOCUMENTS

| | | | | | |
|---|---|---|---|---|---|
| 3,754,074 A | * | 8/1973 | Grantham | ............... | B01D 53/34 423/210.5 |
| 3,880,618 A | * | 4/1975 | McCrea | ................. | B01D 53/04 95/114 |
| 4,859,438 A | * | 8/1989 | Lindbauer | .............. | B01D 53/34 423/239.1 |
| 4,921,886 A | * | 5/1990 | Ewan | .................... | B01D 53/508 423/235 |
| 4,996,036 A | * | 2/1991 | Fisher | .................... | B01D 53/56 423/235 |
| 5,348,716 A | * | 9/1994 | De Soete | ............... | B01D 53/56 423/239.1 |
| 5,489,420 A | * | 2/1996 | Diep | ....................... | B01D 53/56 423/235 |
| 5,846,286 A | * | 12/1998 | Tseng | .................... | B01D 53/56 71/58 |
| 6,136,186 A | | 10/2000 | Gonzalez-Martin et al. | | |

(Continued)

FOREIGN PATENT DOCUMENTS

| | | |
|---|---|---|
| CN | 101721908 | 6/2010 |
| CN | 101626830 | 10/2012 |
| EP | 1 559 753 A2 | 8/2005 |
| EP | 1 645 322 A1 | 4/2006 |
| EP | 2 264 108 A1 | 12/2010 |
| EP | 2 264 109 A1 | 12/2010 |
| EP | 1982759 | 9/2011 |
| JP | H07-196314 A | 8/1995 |
| JP | H07-223813 A | 8/1995 |
| JP | H11-290694 A | 10/1999 |
| JP | 3-113903 B2 | 12/2000 |
| JP | 2001-232206 A | 8/2001 |
| JP | 2003-063852 A | 3/2003 |

(Continued)

OTHER PUBLICATIONS

The International Search Report dated Oct. 5, 2017 from PCT/EP2017/055178.

(Continued)

*Primary Examiner* — Timothy C Vanoy
(74) *Attorney, Agent, or Firm* — Heslin Rothenberg Farley & Mesiti, P.C.

(57) ABSTRACT

The present invention relates to a process for taking up one or more nitrogen oxide(s) from a gaseous and/or aerosol or liquid medium using at least one particulate earth alkali carbonate-comprising material and/or at least one particulate earth alkali phosphate-comprising material as well as an adsorbing material comprising said at least one particulate earth alkali carbonate-comprising material and/or at least one particulate earth alkali phosphate-comprising material.

20 Claims, 1 Drawing Sheet

(56) References Cited

U.S. PATENT DOCUMENTS

| | | | |
|---|---|---|---|
| 8,147,785 B2* | 4/2012 | Pfeffer | B01D 53/56 423/237 |
| 2004/0020410 A1 | 2/2004 | Gane et al. | |
| 2004/0062697 A1 | 4/2004 | Mortson et al. | |
| 2012/0165236 A1 | 6/2012 | Nakamura | |
| 2018/0169573 A1* | 6/2018 | Delplanche | B01J 20/041 |

FOREIGN PATENT DOCUMENTS

| | | |
|---|---|---|
| JP | 2010-172790 A | 8/2010 |
| JP | 2011-041924 A | 3/2011 |
| JP | 2013-146693 A | 8/2013 |
| WO | 00/39222 A1 | 7/2000 |
| WO | 2004/083316 A1 | 9/2004 |
| WO | 2005/121257 A2 | 12/2005 |
| WO | 2006/000565 A1 | 1/2006 |
| WO | 2009/074492 A1 | 6/2009 |
| WO | 2015/044659 A2 | 4/2015 |

OTHER PUBLICATIONS

The Written Opinion of the International Searching Authority dated Oct. 5, 2017 from PCT/EP2017/055178.

* cited by examiner

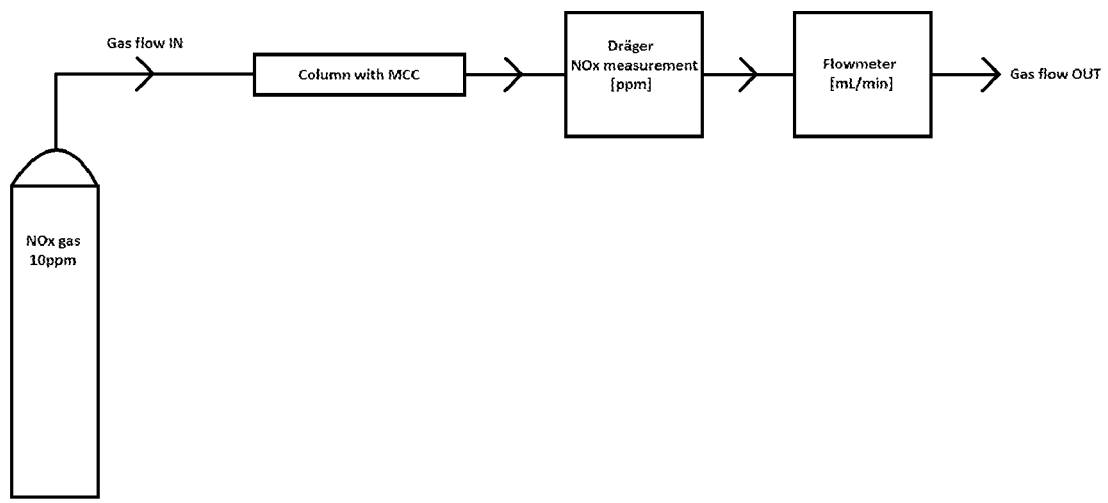

METHOD FOR NO$_x$ UPTAKE USING A PARTICULATE EARTH ALKALI CARBONATE-COMPRISING MATERIAL AND/OR PARTICULATE EARTH ALKALI PHOSPHATE-COMPRISING MATERIAL

CROSS-REFERENCE TO RELATED APPLICATIONS

This is a U.S. national phase of PCT Application No. PCT/EP2017/055178, filed Mar. 6, 2017, which claims priority to U.S. Provisional Application No. 62/307,603, filed Mar. 14, 2016 and European Application No. 16158979.1, filed Mar. 7, 2016.

The present invention relates to a process for taking up one or more nitrogen oxide(s) from a gaseous and/or aerosol or liquid medium using at least one particulate earth alkali carbonate-comprising material and/or at least one particulate earth alkali phosphate-comprising material as well as an adsorbing material comprising said at least one particulate earth alkali carbonate-comprising material and/or at least one particulate earth alkali phosphate-comprising material.

In the last three decades, the pollution of gaseous, aerosol and liquid media such as air, water and soil has become a major environmental concern, especially in urban areas. Pollutants such as nitrogen oxides (NO$_x$) contribute to urban air quality problems, e.g. photochemical smog, and are said to adversely affect the health of human beings as well as of animals and plants. These pollutants are typically emitted in the environment from combustion processes such as power and heating plants, and motor vehicles and/or production processes such as industrial plants.

Furthermore, said pollutants are also known as ozone precursors as the major formation of tropospheric ozone results from a reaction of nitrogen oxides (NO$_x$) and volatile organic compounds in the atmosphere in the presence of sunlight and carbon monoxide. Moreover, such reaction may cause photochemical smog, especially in summer time, comprising peroxyacetyl nitrate (PAN) and acid rain. Children, people with lung diseases such as asthma, and people who work or exercise outside are susceptible to adverse effects of photochemical smog such as damage to lung tissue and reduction in lung function.

In the art, several attempts have been made to reduce the concentration of pollutants such as nitrogen oxides (NO$_x$) in the environment.

For example, a building material with photocatalytic activity towards air pollutants such as NO$_x$ is described in WO 2006/000565, wherein the photocatalytic activity arises from the presence of TiO$_2$ nanoparticles physically mixed with cement. A photocatalytic reactor for oxidation of organic contaminants from gases or water is described in U.S. Pat. No. 6,136,186, wherein the photocatalyst is a porous layer or surface of TiO$_2$ or a binary TiO$_2$, eventually doped with another metal catalyst, formed on a porous surface. EP 1 559 753 relates to a photocatalytic potassium silicate paint that contains TiO$_2$ in the anatase form. The paint is designed for use in residential and public buildings to give anti-pollutant, self-cleaning properties.

The use of calcium carbonate compounds is known in the art for e.g. industrial waste water treatment. For example, JP-A-H07-223813 refers to a porous calcium carbonate compound having a number of pores on the surface which is useful as filter aids.

However, there is still a need in the art for processes for reducing the concentration of nitrogen oxides in gaseous and/or aerosol or liquid media, which provide an improved capability for adsorbing nitrogen oxides (NO$_x$) from the environment and increased efficiency.

It is thus an object of the present invention to provide a process for taking up nitrogen oxides from a gaseous and/or aerosol or liquid medium. Another object may also be seen in the provision of a process for taking up nitrogen oxides from a gaseous and/or aerosol or liquid medium that effectively decreases the amount of nitrogen oxides in a gaseous and/or aerosol or liquid medium. A further object may be seen in the provision of a process for taking up nitrogen oxides from a gaseous and/or aerosol or liquid medium replacing or reducing the use of materials based on TiO$_2$. A further object may be seen in the provision of a process for taking up nitrogen oxides from a gaseous and/or aerosol or liquid medium enabling a low overall energy consumption for the process and corresponding installation. A still further object may be seen in the provision of a process for taking up nitrogen oxides from a gaseous and/or aerosol or liquid medium enabling increasing the efficiency of such a process, especially as regards time and the consumption of chemicals.

One or more of the foregoing and other problems are solved by the subject-matter as defined herein in the independent claims. Advantageous embodiments of the present invention are defined in the corresponding sub-claims.

According to one aspect of the present application a process for taking up one or more nitrogen oxide(s) from a gaseous and/or aerosol or liquid medium is provided. The process comprising, more preferably consisting of the following steps:

a) providing a gaseous and/or aerosol or liquid medium comprising nitrogen oxides, b) providing at least one particulate earth alkali carbonate-comprising material and/or at least one particulate earth alkali phosphate-comprising material having a BET specific surface area as measured by the BET nitrogen method in the range from 10 to 200 m$^2$/g, and c) contacting the gaseous and/or aerosol or liquid medium of step a) with the at least one particulate earth alkali carbonate-comprising material and/or at least one particulate earth alkali phosphate-comprising material of step b) in any order, for taking up at least a part of the one or more nitrogen oxide(s) from the gaseous and/or aerosol or liquid medium onto the surface and/or into the pores of the at least one particulate earth alkali carbonate-comprising material and/or at least one particulate earth alkali phosphate-comprising material, and d) optionally providing at least one particulate calcium carbonate-comprising material and contacting the at least one particulate calcium carbonate-comprising material with the at least one particulate earth alkali carbonate-comprising material and/or at least one particulate earth alkali phosphate-comprising material of step b) before and/or during and/or after step c).

BRIEF DESCRIPTION OF THE DRAWINGS

The invention will be further described by figures and examples without being limited to the described embodiments:

FIG. 1 is a schematic representation of the experimental set up according to Example 3.

DETAILED DESCRIPTION OF THE INVENTION

It should be understood that for the purposes of the present invention, the following terms have the following meanings:

The term "taking up" or "uptake" in the meaning of the present invention refers to, but is not limited to, adsorbing, picking up, and/or assimilating physically and/or chemically one or more nitrogen oxide(s) onto the surface and/or into the pores of particulate earth alkali carbonate-comprising materials and/or particulate earth alkali phosphate-comprising materials such that the surface and/or pores of the particulate earth alkali carbonate-comprising material and/or particulate earth alkali phosphate-comprising material is/are at least partially in contact with the one or more nitrogen oxide(s) or reaction products thereof.

The term "nitrogen oxides" refers to compounds comprising nitrogen oxides or which may be obtained by the reaction of a nitrogen oxide with water, e.g. air humidity. Thus, the term nitrogen oxides preferably comprises compounds selected from the group comprising NO, $NO_2$, $NO_2^-$, $NO_3^-$, $N_2O$, $N_4O$, $N_2O_3$, $N_2O_4$, $N_2O_5$, $N_4O_6$, and mixtures thereof.

The term "gaseous medium" in the meaning of the present invention refers to a medium that exist in a gaseous or vapour state, especially in a temperature range from −10 to 100° C.

The term "aerosol" in the meaning of the present invention refers to a medium that comprises a colloid of fine solid particles and/or liquid droplets, in air or another gas such as fog, particulate air pollutants and smoke. Especially in a temperature range from −10 to 100° C.

The term "liquid medium" in the meaning of the present invention refers to a medium that exist in a liquid state, especially in a temperature range from −10 to 50° C.

The term "earth alkali" in the earth alkali carbonate-comprising material and in the earth alkali phosphate-comprising material in the meaning of the present invention refers to the divalent cations of the earth alkali metals, like magnesium ions, calcium ions, strontium ions or mixtures thereof, preferably magnesium ions, calcium ions or mixtures thereof, most preferably calcium ions.

The term "earth alkali carbonate-comprising material" refers to a material that comprises at least 40.0 wt.-% earth alkali carbonate, based on the total dry weight of the earth alkali carbonate-comprising material. Preferably, the material comprises at least 60.0 wt.-% and more preferably at least 80.0 wt.-% most preferably 90 to 100 wt.-% earth alkali carbonate, based on the total dry weight of the earth alkali carbonate-comprising material.

The term "earth alkali phosphate-comprising material" refers to a material that comprises 8.0 to 100 wt.-% earth alkali phosphate, based on the total dry weight of the earth alkali phosphate-comprising material. Preferably, the material comprises 20.0 to 80.0 wt.-% and more preferably 25.0 to 60.0 wt.-% earth alkali phosphate, based on the total dry weight of the earth alkali phosphate-comprising material.

A "BET specific surface area (SSA)" of a particulate material in the meaning of the present invention is defined as the surface area of the particulate material divided by the mass of the particulate material. As used herein, the specific surface area is measured by nitrogen adsorption using the BET isotherm (ISO 9277:2010), and is specified in $m^2/g$.

The term "calcium carbonate-comprising material" refers to a material that comprises at least 40.0 wt.-% calcium carbonate, based on the total dry weight of the calcium carbonate-comprising material. Preferably, the material comprises at least 60.0 wt.-% and more preferably at least 80.0 wt.-% most preferably 90 to 100 wt.-% calcium carbonate, based on the total dry weight of the calcium carbonate-comprising material. In a preferred embodiment, the calcium carbonate-comprising material is natural ground calcium carbonate (NGCC) and/or precipitated calcium carbonate (PCC).

The term "dry" particulate material refers to a material of which 10 g have been heated in an oven at 150° C. until the mass is constant for at least 1 hour. The mass loss is expressed as wt.-% loss based on the initial material mass. This mass loss has been attributed to the material humidity.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

According to another aspect of the present invention, a particulate earth alkali carbonate-comprising material and/or particulate earth alkali phosphate-comprising material obtained by a process for taking up one or more nitrogen oxide(s) from a gaseous and/or aerosol or liquid medium as defined herein is provided.

According to a further aspect of the present invention, an adsorbing material comprising at least one particulate earth alkali carbonate-comprising material and/or at least one particulate earth alkali phosphate-comprising material as defined herein is provided.

According to still a further aspect of the present invention, the use of at least one particulate earth alkali carbonate-comprising material and/or at least one particulate earth alkali phosphate-comprising material as defined herein for taking up one or more nitrogen oxide(s) from a gaseous and/or aerosol or liquid medium is provided.

It is preferred that the gaseous and/or aerosol or liquid medium comprises one or more nitrogen oxides being selected from the group comprising NO, $NO_2$, $NO_2^-$, $NO_3^-$, $N_2O$, $N_4O$, $N_2O_3$, $N_2O_4$, $N_2O_5$, $N_4O_6$ and mixtures thereof. In one embodiment, the at least one particulate earth alkali carbonate-comprising material and/or at least one particulate earth alkali phosphate-comprising material is in form of a powder, granulated powder, suspension, such as aqueous suspension or suspension in organic solvents, column, cartridge, paint, coating, filter material, gabions, preferably gabions placed next to a motorway or a waste incineration plant, building material, in admixture with solid materials differing from the at least one particulate earth alkali carbonate-comprising material and/or at least one particulate earth alkali phosphate-comprising material and the like.

According to one embodiment of the present process, the medium of step a) is a gaseous medium and/or an aerosol selected from the group comprising air, ambient air, exhaust fumes, factory fumes, household fumes, industrial fumes, vehicle exhausts, fog, smoke and mixtures thereof, or the medium of step a) is a liquid medium selected from the group comprising rain water, drinking water, industrial waste water, urban waste water, agricultural waste water and mixtures thereof.

According to another embodiment of the present process, the gaseous and/or aerosol or liquid medium comprises one or more nitrogen oxide(s) selected from the group comprising $NO$, $NO_2$, $NO_2^-$, $NO_3^-$, $N_2O$, $N_4O$, $N_2O_3$, $N_2O_4$, $N_2O_5$, $N_4O_6$, and mixtures thereof.

According to yet another embodiment of the present process, the gaseous and/or aerosol or liquid medium comprises the one or more nitrogen oxide(s) in a total amount of up to 1 500 ppm, preferably of up to 700 ppm and more preferably in a total amount ranging from 1 to 600 ppm, based on the total volume of the gaseous and/or aerosol or liquid medium.

According to one embodiment of the present process, the at least one particulate earth alkali carbonate-comprising material and/or at least one particulate earth alkali phosphate-comprising material of step b) and/or the at least one particulate calcium carbonate-comprising material of step d) is provided in form of a powder, granulated powder, suspension, such as aqueous suspension or suspension in organic solvents, column, cartridge, paint, coating, filter material, gabions, preferably gabions placed next to a motorway or a waste incineration plant, building material, in admixture with solid materials differing from the at least one particulate earth alkali carbonate-comprising material and/or at least one particulate earth alkali phosphate-comprising material of step b) and/or the at least one particulate calcium carbonate material of step d), mica, clay, talc and the like.

According to another embodiment of the present process, the at least one particulate earth alkali carbonate-comprising material and/or at least one particulate earth alkali phosphate-comprising material of step b) is surface-modified calcium carbonate, or surface-modified calcium carbonate in admixture with apatite, magnesium carbonate, hydromagnesite and/or dolomite.

According to yet another embodiment of the present process, the at least one particulate calcium carbonate-comprising material of step d) is at least one natural ground calcium carbonate (NGCC), and/or at least one precipitated calcium carbonate (PCC) having i) a volume median particle size $d_{50}$ of <30 mm, more preferably from 40 nm to 2 000 μm and most preferably from 60 nm to 400 μm, determined by the light scattering method, and/or ii) a BET specific surface area as measured by the BET nitrogen method of from 0.5 to 200 m²/g, more preferably of from 15 to 175 m²/g and most preferably of from 25 to 100 m²/g, and/or iii) a particle size distribution $d_{98}/d_{50}$ of ≥2, more preferably ≥3, preferably in the range from 3.2 to 5.5, determined by the light scattering method.

According to one embodiment of the present process, the at least one particulate earth alkali phosphate-comprising material and/or at least one particulate earth alkali phosphate-comprising material of step b) is at least one surface-modified calcium carbonate (MCC) having i) a volume median particle size $d_{50}$ of ≥1 μm, more preferably from 1 μm to 100 μm and most preferably from 1.5 μm to 20 μm, determined by the light scattering method, and/or ii) a BET specific surface area as measured by the BET nitrogen method of from 15 to 200 m²/g and most preferably from 30 to 160 m²/g, and/or iii) a particle size distribution $d_{98}/d_{50}$ of ≥1.1, more preferably ≥1.3, preferably in the range from 1.5 to 3, determined by the light scattering method, and/or iv) an intra-particle intruded specific pore volume from 0.150 to 1.300 cm³/g, and preferably from 0.178 to 1.244 cm³/g, calculated from a mercury intrusion porosimetry measurement.

According to another embodiment of the present process, the at least one particulate calcium carbonate-comprising material of step d) and/or the at least one particulate earth alkali carbonate-comprising material and/or the at least one particulate earth alkali phosphate-comprising material of step b) has/have a moisture content of at least 0.001 mg/m².

According to yet another embodiment of the present process, the process comprises a further step e) of exposing the at least one particulate earth alkali carbonate-comprising material and/or at least one particulate earth alkali phosphate-comprising material to UV and/or visible light during and/or after step c).

According to one embodiment of the present process, the process comprises a further step f) of washing the at least one particulate earth alkali carbonate-comprising material and/or at least one particulate earth alkali phosphate-comprising material obtained in step c) or if present step e) in one or more steps such as to remove the one or more nitrogen oxide(s) and/or reaction products thereof from the surface and/or from the pores of the at least one particulate earth alkali carbonate-comprising material and/or at least one particulate earth alkali phosphate-comprising material.

According to another embodiment of the present process, the washing step f) is carried out by contacting the at least one particulate earth alkali carbonate-comprising material and/or at least one particulate earth alkali phosphate-comprising material obtained in step c) or if present step e) with water, an organic solvent, an aqueous solution of at least one basic reacting salt, preferably $Na_2CO_3$ or $Li_2CO_3$, or at least one base, preferably lithium hydroxide, sodium hydroxide, potassium hydroxide, calcium hydroxide, magnesium hydroxide, ammonia, ammonium hydroxide, organic amines or mixtures thereof.

According to yet another embodiment of the present process, the at least one particulate earth alkali carbonate-comprising material and/or at least one particulate earth alkali phosphate-comprising material obtained in washing step f) is re-used in process step b) as the at least one particulate earth alkali carbonate-comprising material and/or at least one particulate earth alkali phosphate-comprising material.

As set out above, the inventive process for adsorbing one or more nitrogen oxide(s) from a gaseous and/or aerosol or liquid medium comprises the steps a), b) and c) and optionally step d). In the following, it is referred to further details of the present invention and especially the foregoing steps of the inventive process for adsorbing one or more nitrogen oxide(s) from a gaseous and/or aerosol or liquid medium.

Those skilled in the art will understand that many embodiments described herein can be combined or applied together.

Characterisation of Step a): Provision of a Gaseous and/or Aerosol or Liquid Medium According to step a) of the process of the present invention, a gaseous and/or aerosol or liquid medium comprising one or more nitrogen oxide(s) is provided.

The term "one or more" nitrogen oxide(s) in the meaning of the present invention means that the nitrogen oxide comprises, preferably consists of, one or more kinds of nitrogen oxide(s).

In one embodiment of the present invention, the one or more nitrogen oxide(s) comprises, preferably consists of, one kind of nitrogen oxide. Alternatively, the one or more nitrogen oxide(s) comprises, preferably consists of, two or more kinds of nitrogen oxides. For example, the one or more nitrogen oxide(s) comprises, preferably consists of, two or three or four kinds of nitrogen oxides.

It is appreciated that the gaseous medium provided in step a) of the instant process can be any gaseous and/or aerosol medium as long as it comprises one or more nitrogen oxide(s). Thus, the gaseous and/or aerosol medium provided in step a) of the instant process can be any natural or artificial gaseous and/or aerosol medium comprising one or more nitrogen oxide(s).

The gaseous and/or aerosol medium of step a) is preferably a medium selected from the group comprising air, ambient air, exhaust fumes, factory fumes, household fumes, industrial fumes, vehicle exhausts, fog, smoke and mixtures thereof.

In one embodiment of the present invention, the gaseous and/or aerosol medium comprises nitrogen oxides selected from the group comprising NO, $NO_2$, $NO_2^-$, $NO_3^-$, $N_2O$, $N_4O$, $N_2O_3$, $N_2O_4$, $N_2O_5$, $N_4O_6$, and mixtures thereof.

It is appreciated that the gaseous and/or aerosol medium preferably comprises a mixture of nitrogen oxides. For example, the gaseous and/or aerosol medium preferably comprises two or more compounds selected from the group comprising NO, $NO_2$, $NO_2^-$, $NO_3^-$, $N_2O$, $N_4O$, $N_2O_3$, $N_2O_4$, $N_2O_5$, $N_4O_6$.

In one embodiment of the present invention, the gaseous and/or aerosol medium comprises $NO_2^-$ and $NO_3^-$ as nitrogen oxides. For example, the gaseous and/or aerosol medium comprises nitrogen oxides consisting of $NO_2^-$ and $NO_3^-$. Alternatively, the gaseous and/or aerosol medium comprises nitrogen oxides comprising, preferably consisting of, $NO_2^-$ and $NO_3^-$ and one or more further nitrogen oxide(s) selected from the group comprising NO, $NO_2$, $N_2O$, $N_4O$, $N_2O_3$, $N_2O_4$, $N_2O_5$, $N_4O_6$.

The gaseous and/or aerosol medium may comprise the one or more nitrogen oxide(s) in any amount. However, in order to obtain a sufficient adsorbing of nitrogen oxides in the process of the present invention, it is preferred that the gaseous and/or aerosol medium comprises the one or more nitrogen oxide(s) in a total amount of up to 1 500 ppm, based on the total volume of the gaseous and/or aerosol medium. For example, the gaseous and/or aerosol medium comprises the one or more nitrogen oxide(s) in a total amount of up to 700 ppm, more preferably in a total amount ranging from 1 to 600 ppm, based on the total volume of the gaseous and/or aerosol medium.

Alternatively, a liquid medium comprising one or more nitrogen oxide(s) is provided in step a).

It is appreciated that the liquid medium provided in step a) of the instant process can be any liquid medium as long as it comprises one or more nitrogen oxide(s). Thus, the liquid medium provided in step a) of the instant process can be any natural or artificial liquid medium comprising one or more nitrogen oxide(s).

It is appreciated that the liquid medium can be an aqueous liquid or an organic liquid.

The term "aqueous" liquid refers to a system, wherein the solvent comprises, preferably consists of, water. In one embodiment, the aqueous liquid further comprises at least one organic solvent such as a water-miscible or water-immiscible solvent. For example, the organic solvent may be selected from the group comprising methanol, ethanol, acetone, acetonitrile, tetrahydrofuran, toluene, benzene, diethyl ether, petroleum ether, dimethylsulphoxide and mixtures thereof. Preferably, the aqueous liquid comprises water in an amount of at least 50.0 wt.-%, preferably at least 60.0 wt.-%, more preferably at least 70.0 wt.-%, even more preferably at least 80.0 wt.-% and most preferably at least 90.0 wt.-%, e.g. at least 95.0 wt.-%, based on the total weight of the aqueous liquid. For example, the aqueous liquid consists of water.

In contrast thereto, the term "organic" liquid refers to a system, wherein the solvent comprises, preferably consists of, an organic solvent. Preferably, the organic solvent is a water-immiscible solvent. For example, the organic solvent may be selected from the group comprising toluene, benzene, diethyl ether, petroleum ether, dimethylsulphoxide and mixtures thereof. In one embodiment, the organic liquid comprises the organic solvent in an amount of at least 90.0 wt.-%, preferably at least 92.0 wt.-%, more preferably at least 94.0 wt.-%, even more preferably at least 96.0 wt.-% and most preferably at least 98.0 wt.-%, e.g. at least 99.0 wt.-%, based on the total weight of the organic liquid. For example, the organic liquid consists of the organic solvent.

The liquid medium of step a) is preferably any medium selected from the group comprising rain water, drinking water, industrial waste water, urban waste water, agricultural waste water and mixtures thereof.

It is appreciated that the liquid medium may comprise solid matter. In case the liquid medium comprises solid matter, the solid matter is preferably such which does not affect the adsorption of nitrogen oxides on the surface of the at least one particulate earth alkali carbonate- and/or phosphate-comprising material. That is to say, the liquid medium is preferably free of at least one particulate earth alkali carbonate-comprising material and/or at least one particulate earth alkali phosphate-comprising material.

Preferably, the liquid medium comprises solids matter in an amount of $\leq 30.0$ wt.-%, preferably $\leq 20.0$ wt.-%, more preferably $\leq 15.0$ wt.-%, even more preferably $\leq 10.0$ wt.-% and most preferably $\leq 8$ wt.-%, e.g. from 0.5 to 8 wt.-%, based on the total weight of the liquid medium. For example, the liquid medium is free of solids matter.

In one embodiment of the present invention, the liquid medium comprises one or more nitrogen oxide(s) selected from the group comprising NO, $NO_2$, $NO_2^-$, $NO_3^-$, $N_2O$, $N_4O$, $N_2O_3$, $N_2O_4$, $N_2O_5$, $N_4O_6$, and mixtures thereof. It is appreciated that the one or more nitrogen oxide(s) are dissolved in the liquid medium.

It is appreciated that the liquid medium preferably comprises a mixture of nitrogen oxides. For example, the liquid medium preferably comprises two or more compounds selected from the group comprising NO, $NO_2$, $NO_2^-$, $NO_3^-$, $N_2O$, $N_4O$, $N_2O_3$, $N_2O_4$, $N_2O_5$, $N_4O_6$.

In one embodiment of the present invention, the liquid medium comprises $NO_2^-$ and $NO_3^-$ as nitrogen oxides. For example, the liquid medium comprises nitrogen oxides consisting of $NO_2^-$ and $NO_3^-$. Alternatively, the liquid medium comprises nitrogen oxides comprising, preferably consisting of, $NO_2^-$ and $NO_3^-$ and one or more further nitrogen oxide(s) selected from the group comprising NO, $NO_2$, $N_2O$, $N_4O$, $N_2O_3$, $N_2O_4$, $N_2O_5$, $N_4O_6$.

It is appreciated that uncharged nitrogen oxide(s) such as NO, $NO_2$, $N_2O$, $N_4O$, $N_2O_3$, $N_2O_4$, $N_2O_5$, $N_4O_6$, may not be stable in the liquid medium and thus, the specific nitrogen oxide may be present together with its decomposition products.

The liquid medium may comprise the one or more nitrogen oxide(s) in any amount. However, in order to obtain a sufficient adsorption of nitrogen oxides in the process of the present invention, it is preferred that the liquid medium comprises the one or more nitrogen oxide(s) in a total amount of up to 1 500 ppm, based on the total volume of the liquid medium. For example, the liquid medium comprises the one or more nitrogen oxide(s) in a total amount of up to 700 ppm, more preferably in a total amount ranging from 1 to 600 ppm, based on the total volume of the liquid medium.

The pH of the liquid medium provided in step a) can vary in a broad range and is preferably in a pH range typically observed for such liquid media. It is thus appreciated that the liquid medium of step a) preferably has a pH value of from 2 to 12. For example, the aqueous preparation of step a) has a pH value of from 6 to 11 and more preferably from 7 to 10, preferably at 23° C.±2° C.

Characterisation of Step b): Provision of at Least One Particulate Earth Alkali Carbonate-Comprising Material and/or at Least One Particulate Earth Alkali Phosphate-Comprising Material According to step b) of the process of the present invention, at least one particulate earth alkali carbonate-comprising material and/or at least one particulate earth alkali phosphate-comprising material is provided.

It is appreciated that the expression "at least one" particulate earth alkali carbonate-comprising material and/or "at least one" particulate earth alkali phosphate-comprising material means that one or more kinds of particulate earth alkali carbonate-comprising material and/or particulate earth alkali phosphate-comprising material can be provided in the process of the present invention.

Accordingly, it should be noted that the at least one particulate earth alkali carbonate-comprising material and/or at least one particulate earth alkali phosphate-comprising material can be one kind of a particulate earth alkali carbonate-comprising material and/or particulate earth alkali phosphate-comprising material. Alternatively, the at least one particulate earth alkali carbonate-comprising material and/or at least one particulate earth alkali phosphate-comprising material can be a mixture of two or more kinds of particulate earth alkali carbonate-comprising materials and/or particulate earth alkali phosphate-comprising materials. For example, the at least one particulate earth alkali carbonate-comprising material and/or at least one particulate earth alkali phosphate-comprising material can be a mixture of two or three kinds of particulate earth alkali carbonate-comprising materials and/or particulate earth alkali phosphate-comprising materials, like two kinds of particulate earth alkali carbonate-comprising materials and/or particulate earth alkali phosphate-comprising materials.

In one embodiment of the present invention, the at least one particulate earth alkali carbonate-comprising material and/or at least one particulate earth alkali phosphate-comprising material is one kind of a particulate earth alkali carbonate-comprising material or particulate earth alkali phosphate-comprising material.

For example, the at least one particulate earth alkali carbonate-comprising material is a calcium carbonate-comprising material and/or a magnesium carbonate-comprising material, preferably a calcium carbonate-comprising material. Additionally or alternatively, the at least one particulate earth alkali phosphate-comprising material is a calcium phosphate-comprising material and/or a magnesium phosphate-comprising material, preferably a calcium phosphate-comprising material.

In one embodiment, the at least one particulate earth alkali carbonate-comprising material and/or at least one particulate earth alkali phosphate-comprising material of step b), preferably the at least one particulate earth alkali carbonate-comprising material of step b), is surface-modified calcium carbonate.

Alternatively, the at least one particulate earth alkali carbonate-comprising material and/or at least one particulate earth alkali phosphate-comprising material of step b) is surface-modified calcium carbonate in admixture with apatite, magnesium carbonate, hydromagnesite and/or dolomite.

"Dolomite" in the meaning of the present invention is a carbonatic calcium-magnesium-mineral having the chemical composition of $CaMg(CO_3)_2$ ("$CaCO_3 \cdot MgCO_3$"). Dolomite mineral contains at least 30.0 wt.-% $MgCO_3$, based on the total weight of dolomite, preferably more than 35.0 wt.-%, more than 40.0 wt.-%, typically from 45.0 to 46.0 wt.-% $MgCO_3$.

"Hydromagnesite" or basic magnesium carbonate, which is the standard industrial name for hydromagnesite, is a naturally occurring mineral which is found in magnesium rich minerals such as serpentine and altered magnesium rich igneous rocks, but also as an alteration product of brucite in periclase marbles. Hydromagnesite has the chemical composition of $Mg_5(CO_3)_4(OH)_2 \cdot 4H_2O$. It should be appreciated that hydromagnesite is a very specific mineral form of magnesium carbonate and occurs naturally as small needle-like crystals or crusts of acicular or bladed crystals. Besides the natural hydromagnesite, synthetic hydromagnesites (or precipitated magnesium carbonates) can be also prepared.

"Apatite" is a naturally occurring mineral and has the chemical composition of $Ca_{10}(PO_4)_6(OH,F,Cl)_2$. The chemical composition of the crystal unit cell formulae of the individual minerals is $Ca_{10}(PO_4)_6(OH)_2$, $Ca_{10}(PO_4)_6(F)_2$, and $Ca_{10}(PO_4)_6(Cl)_2$.

The "surface-modified calcium carbonate" is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source.

A $H_3O^+$ ion donor in the context of the present invention is a Brønsted acid and/or an acid salt.

In a preferred embodiment of the invention the surface-modified calcium carbonate is obtained by a process comprising the steps of: (a) providing a suspension of natural or precipitated calcium carbonate, (b) adding at least one acid having a $pK_a$ value of 0 or less at 20° C. or having a $pK_a$ value from 0 to 2.5 at 20° C. to the suspension of step a), and (c) treating the suspension of step (a) with carbon dioxide before, during or after step (b). According to another embodiment the surface-modified calcium carbonate is obtained by a process comprising the steps of: (A) providing a natural or precipitated calcium carbonate, (B) providing at least one water-soluble acid, (C) providing gaseous $CO_2$, (D) contacting said natural or precipitated calcium carbonate of step (A) with the at least one acid of step (B) and with the $CO_2$ of step (C), characterised in that: (i) the at least one acid of step B) has a $pK_a$ of greater than 2.5 and less than or equal to 7 at 20° C., associated with the ionisation of its first available hydrogen, and a corresponding anion is formed on loss of this first available hydrogen capable of forming a water-soluble calcium salt, and (ii) following contacting the at least one acid with natural or precipitated calcium carbonate, at least one water-soluble salt, which in the case of a hydrogen-containing salt has a $pK_a$ of greater than 7 at 20° C., associated with the ionisation of the first available hydrogen, and the salt anion of which is capable of forming water-insoluble calcium salts, is additionally provided.

"Natural ground calcium carbonate" (GCC) preferably is selected from calcium carbonate containing minerals selected from the group comprising marble, chalk, limestone and mixtures thereof. Natural calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and calcium hydroxide in an aqueous environment or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof.

Precipitated calcium carbonate may be ground prior to the treatment with carbon dioxide and at least one $H_3O^+$ ion donor by the same means as used for grinding natural calcium carbonate as described above.

According to one embodiment of the present invention, the natural or precipitated calcium carbonate is in form of particles having a weight median particle size $d_{50}$ of 0.05 to 10.0 µm, preferably 0.2 to 5.0 µm, more preferably 0.4 to 3.0 µm, most preferably 0.6 to 1.2 µm, especially 0.7 µm. According to a further embodiment of the present invention, the natural or precipitated calcium carbonate is in form of particles having a top cut particle size $d_{98}$ of 0.15 to 55 µm, preferably 1 to 40 µm, more preferably 2 to 25 µm, most preferably 3 to 15 µm, especially 4 µm.

The natural and/or precipitated calcium carbonate may be used dry or suspended in water. Preferably, a corresponding slurry has a content of natural or precipitated calcium carbonate within the range of 1 wt.-% to 90 wt.-%, more preferably 3 wt.-% to 60 wt %, even more preferably 5 wt.-% to 40 wt.-%, and most preferably 10 wt.-% to 25 wt % based on the weight of the slurry.

The one or more $H_3O^+$ ion donor used for the preparation of surface reacted calcium carbonate may be any strong acid, medium-strong acid, or weak acid, or mixtures thereof, generating $H_3O^+$ ions under the preparation conditions. According to the present invention, the at least one $H_3O^+$ ion donor can also be an acidic salt, generating $H_3O^+$ ions under the preparation conditions.

According to one embodiment, the at least one $H_3O^+$ ion donor is a strong acid having a $pK_a$ of 0 or less at 20° C.

According to another embodiment, the at least one $H_3O^+$ ion donor is a medium-strong acid having a $pK_a$ value from 0 to 2.5 at 20° C. If the $pK_a$ at 20° C. is 0 or less, the acid is preferably selected from sulphuric acid, hydrochloric acid, or mixtures thereof. If the $pK_a$ at 20° C. is from 0 to 2.5, the $H_3O^+$ ion donor is preferably selected from $H_2SO_3$, $H_3PO_4$, oxalic acid, or mixtures thereof. The at least one $H_3O^+$ ion donor can also be an acidic salt, for example, $HSO_4^-$ or $H_2PO_4^-$, being at least partially neutralized by a corresponding cation such as $Li^+$, $Na^+$ or $K^+$, or $HPO_4^{2-}$, being at least partially neutralised by a corresponding cation such as $Li^+$, $Na^+$, $K^+$, $Mg^{2+}$ or $Ca^{2+}$. The at least one $H_3O^+$ ion donor can also be a mixture of one or more acids and one or more acidic salts.

According to still another embodiment, the at least one $H_3O^+$ ion donor is a weak acid having a $pK_a$ value of greater than 2.5 and less than or equal to 7, when measured at 20° C., associated with the ionisation of the first available hydrogen, and having a corresponding anion, which is capable of forming water-soluble calcium salts. Subsequently, at least one water-soluble salt, which in the case of a hydrogen-containing salt has a $pK_a$ of greater than 7, when measured at 20° C., associated with the ionisation of the first available hydrogen, and the salt anion of which is capable of forming water-insoluble calcium salts, is additionally provided. According to the preferred embodiment, the weak acid has a $pK_a$ value from greater than 2.5 to 5 at 20° C., and more preferably the weak acid is selected from the group consisting of acetic acid, formic acid, propanoic acid, and mixtures thereof. Exemplary cations of said water-soluble salt are selected from the group consisting of potassium, sodium, lithium and mixtures thereof. In a more preferred embodiment, said cation is sodium or potassium. Exemplary anions of said water-soluble salt are selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water-soluble salt addition may be performed dropwise or in one step. In the case of drop wise addition, this addition preferably takes place within a time period of 10 minutes. It is more preferred to add said salt in one step.

According to one embodiment of the present invention, the at least one $H_3O^+$ ion donor is selected from the group consisting of hydrochloric acid, sulphuric acid, sulphurous acid, phosphoric acid, citric acid, oxalic acid, acetic acid, formic acid, and mixtures thereof. Preferably the at least one $H_3O^+$ ion donor is selected from the group consisting of hydrochloric acid, sulphuric acid, sulphurous acid, phosphoric acid, oxalic acid, $H_2PO_4^-$, being at least partially neutralised by a corresponding cation such as $Li^+$, $Na^+$ or $K^+$, $HPO_4^{2-}$, being at least partially neutralised by a corresponding cation such as $Li^+$, $Na^+$, $K^+$, $Mg^{2+}$, or $Ca^{2+}$ and mixtures thereof, more preferably the at least one acid is selected from the group consisting of hydrochloric acid, sulphuric acid, sulphurous acid, phosphoric acid, oxalic acid, or mixtures thereof, and most preferably, the at least one $H_3O^+$ ion donor is phosphoric acid.

The one or more $H_3O^+$ ion donor can be added to the suspension as a concentrated solution or a more diluted solution. Preferably, the molar ratio of the $H_3O^+$ ion donor to the natural or precipitated calcium carbonate is from 0.01 to 4, more preferably from 0.02 to 2, even more preferably 0.05 to 1 and most preferably 0.1 to 0.58.

As an alternative, it is also possible to add the $H_3O^+$ ion donor to the water before the natural or precipitated calcium carbonate is suspended.

In a next step, the natural or precipitated calcium carbonate is treated with carbon dioxide. If a strong acid such as sulphuric acid or hydrochloric acid is used for the $H_3O^+$ ion donor treatment of the natural or precipitated calcium carbonate, the carbon dioxide is automatically formed. Alternatively or additionally, the carbon dioxide can be supplied from an external source.

$H_3O^+$ ion donor treatment and treatment with carbon dioxide can be carried out simultaneously which is the case when a strong or medium-strong acid is used. It is also possible to carry out $H_3O^+$ ion donor treatment first, e.g. with a medium strong acid having a $pK_a$ in the range of 0 to 2.5 at 20° C., wherein carbon dioxide is formed in situ, and thus, the carbon dioxide treatment will automatically be carried out simultaneously with the $H_3O^+$ ion donor treatment, followed by the additional treatment with carbon dioxide supplied from an external source.

Preferably, the concentration of gaseous carbon dioxide in the suspension is, in terms of volume, such that the ratio (volume of suspension):(volume of gaseous $CO_2$) is from 1:0.05 to 1:20, even more preferably 1:0.05 to 1:5.

In a preferred embodiment, the $H_3O^+$ ion donor treatment step and/or the carbon dioxide treatment step are repeated at least once, more preferably several times. According to one embodiment, the at least one $H_3O^+$ ion donor is added over a time period of at least about 5 min, preferably at least about 10 min, typically from about 10 to about 20 min, more preferably about 30 min, even more preferably about 45 min, and sometimes about 1 h or more.

Subsequent to the $H_3O^+$ ion donor treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural or precipitated calcium carbonate as an aqueous suspension having a pH of greater than 6.0, preferably greater than 6.5, more preferably greater than 7.0, even more preferably greater than 7.5.

Further details about the preparation of the surface-reacted natural calcium carbonate are disclosed in WO 00/39222 A1, WO 2004/083316 A1, WO 2005/121257 A2, WO 2009/074492 A1, EP 2 264 108 A1, EP 2 264 109 A1 and US 2004/0020410 A1, the content of these references herewith being included in the present application.

Similarly, surface-reacted precipitated calcium carbonate is obtained. As can be taken in detail from WO 2009/074492 A1, surface-reacted precipitated calcium carbonate is obtained by contacting precipitated calcium carbonate with $H_3O^+$ ions and with anions being solubilized in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by $H_3O^+$ ions, where said $H_3O^+$ ions are provided solely in the form of a counterion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in situ.

Said $H_3O^+$ ions may be provided by the addition of an acid or an acid salt of said anion, or the addition of an acid or an acid salt which simultaneously serves to provide all or part of said excess solubilized calcium ions.

In a further preferred embodiment of the preparation of the surface-reacted natural or precipitated calcium carbonate, the natural or precipitated calcium carbonate is reacted with the acid and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural or precipitated calcium carbonate before adding the acid and/or carbon dioxide.

Alternatively, the silicate and/or silica and/or aluminium hydroxide and/or earth alkali aluminate and/or magnesium oxide component(s) can be added to the aqueous suspension of natural or precipitated calcium carbonate while the reaction of natural or precipitated calcium carbonate with an acid and carbon dioxide has already started. Further details about the preparation of the surface-reacted natural or precipitated calcium carbonate in the presence of at least one silicate and/or silica and/or aluminium hydroxide and/or earth alkali aluminate component(s) are disclosed in WO 2004/083316 A1, the content of this reference herewith being included in the present application.

The surface-modified calcium carbonate can be kept in suspension, optionally further stabilised by a dispersant. Conventional dispersants known to the skilled person can be used. A preferred dispersant is comprised of polyacrylic acids and/or carboxymethylcelluloses.

Alternatively, the aqueous suspension described above can be dried, thereby obtaining the solid (i.e. dry or containing as little water that it is not in a fluid form) surface-reacted natural or precipitated calcium carbonate in the form of granules or a powder.

The surface-modified calcium carbonate may have different particle shapes, such as e.g. the shape of roses, golf balls and/or brains.

It is one specific requirement of the present process that the at least one particulate earth alkali carbonate-comprising material and/or at least one particulate earth alkali phosphate-comprising material having a BET specific surface area as measured by the BET nitrogen method in the range from 10 to 200 m$^2$/g. This is advantageous as it is assumed that a large surface area, preferably in combination with a high intra-particle intruded specific pore volume, makes it possible for adsorbing nitrogen oxides more efficiently on the surface and/or in the pores of the particles.

Preferably, the at least one particulate earth alkali carbonate-comprising material and/or at least one particulate earth alkali phosphate-comprising material of step b) is at least one surface-modified calcium carbonate (MCC).

The at least one surface-modified calcium carbonate (MCC) preferably has a volume median particle size $d_{50}$ of ≥1 μm, more preferably from 1 μm to 100 μm and most preferably from 1.5 μm to 20 μm, determined by the light scattering method. Such particle size is advantageous as the surface area does not decrease with increasing particle size due to the presence of the intra-particle intruded specific pore volume which is specific for surface-modified calcium carbonate (MCC).

For adsorbing nitrogen oxides it is advantageous if the at least one surface-modified calcium carbonate (MCC) has a high BET specific surface area. Thus, the at least one surface-modified calcium carbonate (MCC) preferably has a BET specific surface area as measured by the BET nitrogen method of from 10 to 200 m$^2$/g, preferably from 15 to 180 m$^2$/g and most preferably from 30 to 160 m$^2$/g.

Additionally or alternatively, the at least one surface-modified calcium carbonate (MCC) preferably has a particle size distribution $d_{98}/d_{50}$ of ≥1.1, more preferably ≥1.3, preferably in the range from 1.5 to 3, determined by the light scattering method. If not otherwise indicated, the particle size distribution $d_{98}/d_{50}$ of the at least one surface-modified calcium carbonate (MCC) is volume based, i.e. $d_{98}$ (vol)/$d_{50}$ (vol).

The value $d_x$ represents the diameter relative to which x % of the particles have diameters less than $d_x$. This means that the $d_{98}$ value is the particle size at which 98% of all particles are smaller. The $d_{98}$ value is also designated as "top cut". The $d_x$ values may be given in volume or weight percent. The $d_{50}$(wt) value is thus the weight median particle size, i.e. 50 wt % of all grains are smaller than this particle size, and the $d_{50}$ (vol) value is the volume median particle size, i.e. 50 vol. % of all grains are smaller than this particle size.

Volume median grain diameter $d_{50}$ was evaluated using a Malvern Mastersizer 2000 Laser Diffraction System. The $d_{50}$ or $d_{98}$ value, measured using a Malvern Mastersizer 2000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

The weight median grain diameter is determined by the sedimentation method, which is an analysis of sedimentation behaviour in a gravimetric field. The measurement is made with a Sedigraph™ 5100 or 5120, Micromeritics Instrument Corporation. The method and the instrument are known to the skilled person and are commonly used to determine grain size of fillers and pigments. The measurement is carried out in an aqueous solution of 0.1 wt % $Na_4P_2O_7$. The samples were dispersed using a high speed stirrer and sonicated.

The processes and instruments are known to the skilled person and are commonly used to determine grain size of fillers and pigments.

As already mentioned above, the at least one surface-modified calcium carbonate (MCC) preferably features a specific intra-particle intruded specific pore volume which increases the particles' surface area such that nitrogen oxides can be adsorbed more sufficiently on the surface-modified calcium carbonate (MCC) particles. Preferably, the at least one surface-modified calcium carbonate (MCC) has an intra-particle intruded specific pore volume from 0.150 to 1.300 cm$^3$/g, and preferably from 0.178 to 1.244 cm$^3$/g, calculated from a mercury intrusion porosimetry measurement.

The intra-particle pore size of the at least one surface-modified calcium carbonate preferably is in a range of from 0.004 to 1.6 μm, more preferably in a range of from 0.005 to 1.3 μm, especially preferably from 0.006 to 1.15 μm and most preferably of 0.007 to 1.0 μm, determined by mercury porosimetry measurement.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm. The equilibration time used at each pressure step is 20 seconds. The sample material is sealed in a 5 cm$^3$ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine interparticle packing of the particles themselves. If they also have intraparticle pores, then this region appears bi modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Thus, the at least one surface-modified calcium carbonate (MCC) preferably has
i) a volume median particle size $d_{50}$ of ≥1 μm, more preferably from 1 μm to 100 μm and most preferably from 1.5 μm to 20 μm, determined by the light scattering method, and/or ii) a BET specific surface area as measured by the BET nitrogen method of from 10 to 200 m$^2$/g, preferably from 15 to 200 m$^2$/g and most preferably from 30 to 160 m$^2$/g, and/or iii) a particle size distribution $d_{98}/d_{50}$ of ≥1.1, more preferably ≥1.3, preferably in the range from 1.5 to 3, determined by the light scattering method, and/or iv) an intra-particle intruded specific pore volume from 0.150 to 1.300 cm$^3$/g, and preferably from 0.178 to 1.244 cm$^3$/g, calculated from a mercury intrusion porosimetry measurement.

In one embodiment, the at least one surface-modified calcium carbonate (MCC) preferably has i) a volume median particle size $d_{50}$ of ≥1 μm, more preferably from 1 μm to 100 μm and most preferably from 1.5 μm to 20 μm, determined by the light scattering method, or ii) a BET specific surface area as measured by the BET nitrogen method of from 10 to 200 m$^2$/g, preferably from 15 to 200 m$^2$/g and most preferably from 30 to 160 m$^2$/g, or iii) a particle size distribution $d_{98}/d_{50}$ of ≥1.1, more preferably ≥1.3, preferably in the range from 1.5 to 3, determined by the light scattering method, or iv) an intra-particle intruded specific pore volume from 0.150 to 1.300 cm$^3$/g, and preferably from 0.178 to 1.244 cm$^3$/g, calculated from a mercury intrusion porosimetry measurement.

For example, the at least one surface-modified calcium carbonate (MCC) preferably has i) a volume median particle size $d_{50}$ of ≥1 μm, more preferably from 1 μm to 100 μm and most preferably from 1.5 μm to 20 μm, determined by the light scattering method, and ii) a BET specific surface area as measured by the BET nitrogen method of from 10 to 200 m$^2$/g, preferably from 15 to 200 m$^2$/g and most preferably from 30 to 160 m$^2$/g, or iii) a particle size distribution $d_{98}/d_{50}$ of ≥1.1, more preferably ≥1.3, preferably in the range from 1.5 to 3, determined by the light scattering method, or iv) an intra-particle intruded specific pore volume from 0.150 to 1.300 cm$^3$/g, and preferably from 0.178 to 1.244 cm$^3$/g, calculated from a mercury intrusion porosimetry measurement.

For example, the at least one surface-modified calcium carbonate (MCC) preferably has i) a volume median particle size $d_{50}$ of ≥1 μm, more preferably from 1 μm to 100 μm and most preferably from 1.5 μm to 20 μm, determined by the light scattering method, or ii) a BET specific surface area as measured by the BET nitrogen method of from 10 to 200 m$^2$/g, preferably from 15 to 200 m$^2$/g and most preferably from 30 to 160 m$^2$/g, and iii) a particle size distribution $d_{98}/d_{50}$ of ≥1.1, more preferably ≥1.3, preferably in the range from 1.5 to 3, determined by the light scattering method, or iv) an intra-particle intruded specific pore volume from 0.150 to 1.300 cm$^3$/g, and preferably from 0.178 to 1.244 cm$^3$/g, calculated from a mercury intrusion porosimetry measurement.

For example, the at least one surface-modified calcium carbonate (MCC) preferably has i) a volume median particle size $d_{50}$ of ≥1 μm, more preferably from 1 μm to 100 μm and most preferably from 1.5 μm to 20 μm, determined by the light scattering method, or ii) a BET specific surface area as measured by the BET nitrogen method of from 10 to 200 m$^2$/g, preferably from 15 to 200 m$^2$/g and most preferably from 30 to 160 m$^2$/g, or iii) a particle size distribution $d_{98}/d_{50}$ of ≥1.1, more preferably ≥1.3, preferably in the range from 1.5 to 3, determined by the light scattering method, and iv) an intra-particle intruded specific pore volume from 0.150 to 1.300 cm$^3$/g, and preferably from 0.178 to 1.244 cm$^3$/g, calculated from a mercury intrusion porosimetry measurement.

For example, the at least one surface-modified calcium carbonate (MCC) preferably has i) a volume median particle size $d_{50}$ of ≥1 μm, more preferably from 1 μm to 100 μm and most preferably from 1.5 μm to 20 μm, determined by the light scattering method, and ii) a BET specific surface area as measured by the BET nitrogen method of from 10 to 200 m$^2$/g, preferably from 15 to 200 m$^2$/g and most preferably from 30 to 160 m$^2$/g, and iii) a particle size distribution $d_{98}/d_{50}$ of ≥1.1, more preferably ≥1.3, preferably in the range from 1.5 to 3, determined by the light scattering method, and iv) an intra-particle intruded specific pore volume from 0.150 to 1.300 cm$^3$/g, and preferably from 0.178 to 1.244 cm$^3$/g, calculated from a mercury intrusion porosimetry measurement.

For example, the at least one surface-modified calcium carbonate (MCC) preferably has i) a volume median particle size $d_{50}$ of ≥1 μm, more preferably from 1 μm to 100 μm and most preferably from 1.5 μm to 20 μm, determined by the light scattering method, and ii) a BET specific surface area as measured by the BET nitrogen method of from 10 to 200 m$^2$/g, preferably from 15 to 200 m$^2$/g and most preferably from 30 to 160 m$^2$/g, or iii) a particle size distribution $d_{98}/d_{50}$ of ≥1.1, more preferably ≥1.3, preferably in the range from 1.5 to 3, determined by the light scattering method, and iv) an intra-particle intruded specific pore volume from 0.150 to 1.300 cm$^3$/g, and preferably from 0.178 to 1.244 cm$^3$/g, calculated from a mercury intrusion porosimetry measurement.

Alternatively, the at least one surface-modified calcium carbonate (MCC) preferably has i) a volume median particle size $d_{50}$ of ≥1 μm, more preferably from 1 μm to 100 μm and most preferably from 1.5 μm to 20 μm, determined by the light scattering method, and ii) a BET specific surface area as measured by the BET nitrogen method of from 10 to 200 m$^2$/g, preferably from 15 to 200 m$^2$/g and most preferably from 30 to 160 m$^2$/g, and iii) a particle size distribution $d_{98}/d_{50}$ of ≥1.1, more preferably ≥1.3, preferably in the range from 1.5 to 3, determined by the light scattering method, and iv) an intra-particle intruded specific pore volume from 0.150 to 1.300 cm$^3$/g, and preferably from 0.178 to 1.244 cm$^3$/g, calculated from a mercury intrusion porosimetry measurement.

In view of the advantageous surface properties of the surface-modified calcium carbonate, the at least one particulate earth alkali carbonate-comprising material and/or at least one particulate earth alkali phosphate-comprising material of step b) is preferably at least one surface-modified calcium carbonate (MCC).

In one embodiment, the at least one particulate earth alkali carbonate-comprising material and/or at least one particulate earth alkali phosphate-comprising material of step b) has a moisture content of at least 0.001 mg/m$^2$. For example, the at least one particulate earth alkali carbonate-comprising material and/or at least one particulate earth alkali phosphate-comprising material of step b) has a moisture content in the range from 0.001 to 0.3 mg/m$^2$.

The at least one particulate earth alkali carbonate-comprising material and/or at least one particulate earth alkali phosphate-comprising material of step b) can be provided in any form, especially in any form which is suitable for exposing a large surface area to the one or more nitrogen oxide(s) which is/are present in the gaseous and/or aerosol or liquid medium.

Thus, the at least one particulate earth alkali carbonate-comprising material and/or at least one particulate earth alkali phosphate-comprising material of step b) is preferably provided in form of a powder, granulated powder, suspension such as aqueous suspension or suspension in organic solvents, column, cartridge, paint, coating, filter material, gabions, preferably gabions placed next to a motorway or a waste incineration plant, building material, in admixture with solid materials differing from the at least one particulate earth alkali carbonate-comprising material and/or at least one particulate earth alkali phosphate-comprising material, mica, clay, talc and the like.

Characterisation of Step c): Contacting the Gaseous and/or Aerosol or Liquid Medium with the at Least One Particulate Earth Alkali Carbonate-Comprising Material and/or at Least One Particulate Earth Alkali Phosphate-Comprising Material According to step c) of the process of the present invention, the gaseous and/or aerosol or liquid medium of step a) is contacted with the at least one particulate earth alkali carbonate-comprising material and/or at least one particulate earth alkali phosphate-comprising material of step b) in any order, taking up at least a part of the nitrogen oxides from the gaseous and/or aerosol or liquid medium onto the surface and/or into the pores of the at least one particulate earth alkali carbonate-comprising material and/or at least one particulate earth alkali phosphate-comprising material.

In general, the gaseous and/or aerosol or liquid medium of step a) and the at least one particulate earth alkali carbonate-comprising material and/or at least one particulate earth alkali phosphate-comprising material of step b) can be brought into contact by any conventional means known to the skilled person.

For example, contacting step c) is carried out by adding the at least one particulate earth alkali carbonate-comprising material and/or at least one particulate earth alkali phosphate-comprising material of step b) to the gaseous and/or aerosol or liquid medium of step a). This embodiment is especially preferred if the at least one particulate earth alkali carbonate-comprising material and/or at least one particulate earth alkali phosphate-comprising material is provided in form of a powder, granulated powder and/or suspension such as aqueous suspension or suspension in organic solvents. For example, the organic solvent may be selected from the group comprising methanol, ethanol, acetone, acetonitrile, tetrahydrofuran, toluene, benzene, diethyl ether, petroleum ether, dimethylsulphoxide and mixtures thereof.

Additionally or alternatively, contacting step c) is carried out by passing the gaseous and/or aerosol or liquid medium of step a) through the at least one particulate earth alkali carbonate-comprising material and/or at least one particulate earth alkali phosphate-comprising material of step b). This embodiment is especially preferred if the at least one particulate earth alkali carbonate-comprising material and/or at least one particulate earth alkali phosphate-comprising material is provided in form of a column, cartridge, or filter material.

Additionally or alternatively, contacting step c) is carried out by passing the gaseous and/or aerosol or liquid medium of step a) over the at least one particulate earth alkali carbonate-comprising material and/or at least one particulate earth alkali phosphate-comprising material of step b). This embodiment is especially preferred if the at least one particulate earth alkali carbonate-comprising material and/or at least one particulate earth alkali phosphate-comprising material is provided in provided in form of a paint, coating, filter material and/or building material.

In one embodiment of the present invention, the step of contacting the gaseous and/or aerosol or liquid medium of step a) and at least one particulate earth alkali carbonate-comprising material and/or at least one particulate earth alkali phosphate-comprising material of step b) is carried out under mixing. In one embodiment of the present invention, contacting step c) is carried out under agitation to ensure a thorough mixing of the gaseous and/or aerosol or liquid medium of step a) and the at least one particulate earth alkali carbonate-comprising material and/or at least one particulate earth alkali phosphate-comprising material of step b). Such agitation can be carried out continuously or discontinuously. This embodiment is especially preferred if the at least one particulate earth alkali carbonate-comprising material and/or at least one particulate earth alkali phosphate-comprising material is provided in form of a powder, granulated powder and/or suspension such as aqueous suspension or suspension in organic solvents.

It is appreciated that the gaseous and/or aerosol or liquid medium of step a) is contacted with the at least one particulate earth alkali carbonate-comprising material and/or at least one particulate earth alkali phosphate-comprising material of step b) at a concentration and for a time sufficient for taking up the one or more nitrogen oxide(s) from the gaseous and/or aerosol or liquid medium onto the surface and/or into the pores of the at least one particulate earth alkali carbonate-comprising material and/or at least one particulate earth alkali phosphate-comprising material.

In general, the amount of the at least one particulate earth alkali carbonate-comprising material and/or at least one particulate earth alkali phosphate-comprising material of step b) for taking up the one or more nitrogen oxide(s) from the gaseous and/or aerosol or liquid medium may vary depending on the nitrogen oxide content in the gaseous and/or aerosol or liquid medium and the at least one particulate earth alkali carbonate-comprising material and/or at least one particulate earth alkali phosphate-comprising material used.

It is appreciated that contacting step c) is carried out for a time sufficient for taking up the one or more nitrogen oxide(s) from the gaseous and/or aerosol or liquid medium onto the surface and/or into the pores of the at least one particulate earth alkali carbonate-comprising material and/or at least one particulate earth alkali phosphate-comprising material.

In one embodiment, the contacting is carried out for a time such that no further decrease of the nitrogen oxide amount in the gaseous and/or aerosol or liquid medium is detected. This is preferably the case if the contacting is carried out in a batch process. The contacting time may be empirically determined using common methods known to the skilled person or described in the present application.

For example, a sufficient time for contacting the gaseous and/or aerosol or liquid medium of step a) with the at least one particulate earth alkali carbonate-comprising material and/or at least one particulate earth alkali phosphate-comprising material of step b) is in the range from 0.1 millisecond to 4 weeks, preferably in the range from 1 millisecond to 3 weeks, more preferably in the range from 2 millisecond to 1 day, and most preferably in the range from 3 millisecond to 1 hour. The contacting typically starts when the at least one particulate earth alkali carbonate-comprising material and/or at least one particulate earth alkali phosphate-comprising material of step b) is thoroughly covered with the gaseous and/or aerosol or liquid medium of step a).

It is appreciated that contacting step c) can be repeated one or more times.

Alternatively, contacting step c) is carried out in a continuous process.

It is appreciated that contacting step c) is preferably carried out at a temperature ranging from −40 to 600° C., more preferably from −30 to 450°, and most preferably from −20 to 350° C.

The gaseous and/or aerosol or liquid medium obtained in step c) preferably has a nitrogen oxide content below the nitrogen oxide content of the gaseous and/or aerosol or liquid medium provided in step a).

Characterisation of Optional Step d): Provision of at least One Particulate Calcium Carbonate-Comprising Material According to optional step d), at least one particulate calcium carbonate-comprising material is provided and the at least one particulate calcium carbonate-comprising material is contacted with the at least one particulate earth alkali carbonate-comprising material and/or at least one particulate earth alkali phosphate-comprising material of step b) before and/or during and/or after step c).

It is appreciated that the at least one particulate calcium carbonate-comprising material of step d) preferably differs from the at least one particulate earth alkali carbonate-comprising material and/or at least one particulate earth alkali phosphate-comprising material of step b).

The expression "at least one" particulate calcium carbonate-comprising material means that one or more kinds of particulate calcium carbonate-comprising material can be provided in optional step d).

Accordingly, it should be noted that the at least one particulate calcium carbonate-comprising material can be one kind of a particulate calcium carbonate-comprising material. Alternatively, the at least one particulate calcium carbonate-comprising material can be a mixture of two or more kinds of particulate calcium carbonate-comprising materials. For example, the at least one particulate calcium carbonate-comprising material can be a mixture of two or three kinds of particulate calcium carbonate-comprising material, like two kinds of particulate calcium carbonate-comprising materials.

Preferably, the at least one particulate calcium carbonate-comprising material is one kind of a particulate calcium carbonate-comprising material.

For example, the at least one particulate calcium carbonate-comprising material of step d) is at least one natural ground calcium carbonate and/or at least one precipitated calcium carbonate.

In one embodiment, the at least one particulate calcium carbonate-comprising material of step d) is at least one natural ground calcium carbonate and at least one precipitated calcium carbonate. Alternatively, the at least one particulate calcium carbonate-comprising material of step d) is at least one natural ground calcium carbonate or at least one precipitated calcium carbonate, preferably at least one natural ground calcium carbonate.

"Natural ground calcium carbonate" (NGCC) in the meaning of the present invention is a calcium carbonate obtained from natural sources, such as limestone, marble or chalk, and processed through a wet and/or dry treatment such as grinding, screening and/or fractionating, for example by a cyclone or classifier.

According to one embodiment of the present invention the NGCC is obtained by dry grinding. According to another embodiment of the present invention the NGCC is obtained by wet grinding and subsequent drying.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case earth alkali carbonate-comprising material comprises a wet ground calcium carbonate-comprising material, the grinding step may be performed under conditions such that autogenous grinding takes place and/or by horizontal ball milling, and/or other such processes known to the skilled man. The wet processed ground calcium carbonate-comprising material thus obtained may be washed and dewatered by well-known processes, e.g. by flocculation, filtration or forced evaporation prior to drying. The subsequent step of drying may be carried out in a single step such as spray drying, or in at least two steps. It is also common that such a calcium carbonate material undergoes a beneficiation step (such as a flotation, bleaching or magnetic separation step) to remove impurities.

In one embodiment of the present invention, the NGCC is selected from the group comprising marble, chalk, limestone and mixtures thereof.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. PCC may be one or more of the aragonitic, vateritic and calcitic mineralogical crystal forms. Preferably, PCC is one of the aragonitic, vateritic and calcitic mineralogical crystal forms.

Aragonite is commonly in the acicular form, whereas vaterite belongs to the hexagonal crystal system. Calcite can form scalenohedral, prismatic, spheral and rhombohedral forms. PCC can be produced in different ways, e.g. by precipitation with carbon dioxide, the lime soda process, or the Solvay process in which PCC is a by-product of ammonia production. The obtained PCC slurry can be mechanically dewatered and dried.

The at least one natural ground calcium carbonate (NGCC), and/or at least one precipitated calcium carbonate (PCC) preferably has/have a volume median particle size $d_{50}$ of <30 mm, more preferably from 40 nm to 2 000 µm and most preferably from 60 nm to 400 µm, determined by the light scattering method.

For adsorbing nitrogen oxides it is advantageous if the at least one natural ground calcium carbonate (NGCC), and/or at least one precipitated calcium carbonate (PCC) has a high BET specific surface area. Thus, the at least one natural ground calcium carbonate (NGCC), and/or at least one precipitated calcium carbonate (PCC) preferably has a BET specific surface area as measured by the BET nitrogen method of from 0.5 to 200 m$^2$/g, more preferably of from 15 to 175 m$^2$/g and most preferably of from 25 to 100 m$^2$/g, measured by nitrogen gas adsorption using the BET isotherm (ISO 9277:2010).

Additionally or alternatively, the at least one natural ground calcium carbonate (NGCC), and/or at least one precipitated calcium carbonate (PCC) has a particle size distribution $d_{98}/d_{50}$ of ≥2, more preferably ≥3, preferably in the range from 3.2 to 5.5, determined by the light scattering method. If not otherwise indicated, the particle size distribution $d_{98}/d_{50}$ of the at least one natural ground calcium carbonate (NGCC), and/or at least one precipitated calcium carbonate (PCC) is volume based, i.e. $d_{98}$ (vol)/$d_{50}$ (vol).

Thus, the at least one natural ground calcium carbonate (NGCC), and/or at least one precipitated calcium carbonate (PCC) preferably has
  i) a volume median particle size $d_{50}$ of <30 mm, more preferably from 40 nm to 2 000 µm and most preferably from 60 nm to 400 µm, determined by the light scattering method, and/or
  ii) a BET specific surface area as measured by the BET nitrogen method of from 0.5 to 200 m$^2$/g, more preferably of from 15 to 175 m$^2$/g and most preferably of from 25 to 100 m$^2$/g, and/or
  iii) a particle size distribution $d_{98}/d_{50}$ of ≥2, more preferably ≥3, preferably in the range from 3.2 to 5.5, determined by the light scattering method.

For example, the at least one natural ground calcium carbonate (NGCC), and/or at least one precipitated calcium carbonate (PCC) preferably has
  i) a volume median particle size $d_{50}$ of <30 mm, more preferably from 40 nm to 2 000 µm and most preferably from 60 nm to 400 µm, determined by the light scattering method, or
  ii) a BET specific surface area as measured by the BET nitrogen method of from 0.5 to 200 m$^2$/g, more preferably of from 15 to 175 m$^2$/g and most preferably of from 25 to 100 m$^2$/g, or
  iii) a particle size distribution $d_{98}/d_{50}$ of ≥2, more preferably ≥3, preferably in the range from 3.2 to 5.5, determined by the light scattering method.

In one embodiment, the at least one natural ground calcium carbonate (NGCC), and/or at least one precipitated calcium carbonate (PCC) preferably has
  i) a volume median particle size $d_{50}$ of <30 mm, more preferably from 40 nm to 2 000 µm and most preferably from 60 nm to 400 µm, determined by the light scattering method, and
  ii) a BET specific surface area as measured by the BET nitrogen method of from 0.5 to 200 m$^2$/g, more preferably of from 15 to 175 m$^2$/g and most preferably of from 25 to 100 m$^2$/g, or
  iii) a particle size distribution $d_{98}/d_{50}$ of ≥2, more preferably ≥3, preferably in the range from 3.2 to 5.5, determined by the light scattering method.

In an alternative embodiment, the at least one natural ground calcium carbonate (NGCC), and/or at least one precipitated calcium carbonate (PCC) preferably has
  i) a volume median particle size $d_{50}$ of <30 mm, more preferably from 40 nm to 2 000 µm and most preferably from 60 nm to 400 µm, determined by the light scattering method, or
  ii) a BET specific surface area as measured by the BET nitrogen method of from 0.5 to 200 m$^2$/g, more preferably of from 15 to 175 m$^2$/g and most preferably of from 25 to 100 m$^2$/g, and
  iii) a particle size distribution $d_{98}/d_{50}$ of ≥2, more preferably ≥3, preferably in the range from 3.2 to 5.5, determined by the light scattering method.

Alternatively, the at least one natural ground calcium carbonate (NGCC), and/or at least one precipitated calcium carbonate (PCC) preferably has
  i) a volume median particle size $d_{50}$ of <30 mm, more preferably from 40 nm to 2 000 µm and most preferably from 60 nm to 400 µm, determined by the light scattering method, and
  ii) a BET specific surface area as measured by the BET nitrogen method of from 0.5 to 200 m$^2$/g, more preferably of from 15 to 175 m$^2$/g and most preferably of from 25 to 100 m$^2$/g, and
  iii) a particle size distribution $d_{98}/d_{50}$ of ≥2, more preferably ≥3, preferably in the range from 3.2 to 5.5, determined by the light scattering method.

In one embodiment, the at least one natural ground calcium carbonate (NGCC), and/or at least one precipitated calcium carbonate (PCC) is preferably at least one natural ground calcium carbonate (NGCC).

In one embodiment, the particulate calcium carbonate-comprising material of step d) has a moisture content of at least 0.001 mg/m$^2$. For example, the particulate calcium carbonate-comprising material of step d) has a moisture content in the range from 0.001 to 0.3 mg/m$^2$.

The particulate calcium carbonate-comprising material of step d) can be provided in any form, especially in any form which is suitable for exposing a large surface area to the one or more nitrogen oxide(s) which is/are present in the gaseous and/or aerosol or liquid medium.

Thus, the particulate calcium carbonate-comprising material of step d) is preferably provided in form of a powder, granulated powder, suspension such as aqueous suspension or suspension in organic solvents, column, cartridge, paint, coating, filter material, gabions, preferably gabions placed next to a motorway or a waste incineration plant, building material, in admixture with solid materials differing from the particulate calcium carbonate-comprising material of step d), mica, clay, talc and the like.

It is appreciated that the at least one particulate calcium carbonate-comprising material is contacted with the at least one particulate earth alkali carbonate-comprising material and/or at least one particulate earth alkali phosphate-comprising material of step b) before and/or during and/or after step c).

In one embodiment, the at least one particulate calcium carbonate-comprising material is contacted with the at least one particulate earth alkali carbonate-comprising material and/or at least one particulate earth alkali phosphate-comprising material of step b) before and during and after step c). Alternatively, the at least one particulate calcium carbonate-comprising material is contacted with the at least one particulate earth alkali carbonate-comprising material and/or at least one particulate earth alkali phosphate-comprising material of step b) before or during or after step c).

Preferably, the at least one particulate calcium carbonate-comprising material is contacted with the at least one particulate earth alkali carbonate-comprising material and/or at least one particulate earth alkali phosphate-comprising material of step b) before step c).

Thus, the process for taking up one or more nitrogen oxide(s) from a gaseous and/or aerosol or liquid medium preferably comprises, more preferably consists of, the following steps:
  a) providing a gaseous and/or aerosol or liquid medium comprising nitrogen oxides,
  b) providing at least one particulate earth alkali carbonate-comprising material and/or at least one particulate earth alkali phosphate-comprising material having a BET specific surface area as measured by the BET nitrogen method in the range from 10 to 200 m$^2$/g,
  c) contacting the gaseous and/or aerosol or liquid medium of step a) with the at least one particulate earth alkali carbonate-comprising material and/or at least one particulate earth alkali phosphate-comprising material of step b) in any order, for taking up at least a part of the one or more nitrogen oxide(s) from the gaseous and/or aerosol or liquid medium onto the surface and/or into the pores of the at least one particulate earth alkali carbonate-comprising material and/or at least one particulate earth alkali phosphate-comprising material, and d) providing at least one particulate calcium carbonate-comprising material and contacting the at least one particulate calcium carbonate-comprising material with the at least one particulate earth alkali carbonate-comprising material and/or at least one particulate earth alkali phosphate-comprising material of step b) before and/or during and/or after step c).

It is appreciated that the process for adsorbing nitrogen oxides from a gaseous or liquid medium may comprise a further step e) of exposing the at least one particulate earth alkali carbonate-comprising material and/or at least one particulate earth alkali phosphate-comprising material of step b) to UV and/or visible light during and/or after step c). For example, the term "UV light" refers to a light having a wavelength in the range from 10 to 380 nm. The term "visible light" refers to a light having a wavelength in the range from 380 to 800 nm.

For example, step e) is carried out during contacting step c). Alternatively, step e) is carried out after contacting step c).

Accordingly, steps c) and e) are carried out simultaneously, or separately in the given order. For example, steps c) and e) are carried out separately in the given order, i.e. step e) is carried out after step c). Alternatively, steps c) and e) are carried out simultaneously.

It is appreciated that step e) can be repeated one or more times.

It is appreciated that exposing step e) can be carried by any means known to the skilled person which is suitable for exposing the at least one particulate earth alkali carbonate-comprising material and/or at least one particulate earth alkali phosphate-comprising material of step b) to UV and/or visible light.

For example, such UV and/or visible light exposing step can be achieved by a corresponding lamp.

Exposing step e) can be carried out in a batch or continuous process. Preferably, exposing step e) is carried out in a continuous process.

Thus, the process for taking up one or more nitrogen oxide(s) from a gaseous and/or aerosol or liquid medium preferably comprises, more preferably consists of, the steps of:

a) providing a gaseous and/or aerosol or liquid medium comprising nitrogen oxides,
b) providing at least one particulate earth alkali carbonate-comprising material and/or at least one particulate earth alkali phosphate-comprising material having a BET specific surface area as measured by the BET nitrogen method in the range from 10 to 200 m²/g, and
c) contacting the gaseous and/or aerosol or liquid medium of step a) with the at least one particulate earth alkali carbonate-comprising material and/or at least one particulate earth alkali phosphate-comprising material of step b) in any order, for taking up at least a part of the one or more nitrogen oxide(s) from the gaseous and/or aerosol or liquid medium onto the surface and/or into the pores of the at least one particulate earth alkali carbonate-comprising material and/or at least one particulate earth alkali phosphate-comprising material,
d) optionally providing at least one particulate calcium carbonate-comprising material and contacting the at least one particulate calcium carbonate-comprising material with the at least one particulate earth alkali carbonate-comprising material and/or at least one particulate earth alkali phosphate-comprising material of step b) before and/or during and/or after step c), and
e) exposing the at least one particulate earth alkali carbonate-comprising material and/or at least one particulate earth alkali phosphate-comprising material to UV and/or visible light during and/or after step c).

Additionally or alternatively, the process for taking up one or more nitrogen oxide(s) from a gaseous and/or aerosol or liquid medium comprises a further step 0 of washing the at least one particulate earth alkali carbonate-comprising material and/or at least one particulate earth alkali phosphate-comprising material obtained in step c) and/or e) in one or more steps such as to remove the one or more nitrogen oxide(s) and/or reaction products thereof from the surface and/or from the pores of the at least one particulate earth alkali carbonate-comprising material and/or at least one particulate earth alkali phosphate-comprising material.

The term "reaction products" of the one or more nitrogen oxide(s) in the meaning of the present invention refers to products obtained by contacting at least one particulate earth alkali carbonate-comprising material and/or at least one particulate earth alkali phosphate-comprising material with one or more nitrogen oxide(s). Said reaction products are formed between the one or more nitrogen oxide(s) and reactive molecules, for example water molecules, located at the surface of the at least one particulate earth alkali carbonate-comprising material and/or at least one particulate earth alkali phosphate-comprising material.

Step f) is specifically advantageous as the at least one particulate earth alkali carbonate-comprising material and/or at least one particulate earth alkali phosphate-comprising material obtained in step f) can be re-used as the at least one particulate earth alkali carbonate-comprising material and/or at least one particulate earth alkali phosphate-comprising material of step b). Thus, this step severely reduces the consumption of adsorbent and thus this step is suitable for increasing the overall efficiency, especially as regards the consumption of chemicals, of the inventive process.

For example, step e) is carried out after contacting step c). Alternatively, step f) is carried out after exposing step e).

Accordingly, steps c) and f) or steps e) and f) are carried out separately in the given order, i.e. step f) is carried out after step c) or, if present, step e).

It is appreciated that step f) can be repeated one or more times.

It is appreciated that washing step f) can be carried by any means known to the skilled person which is suitable for removing one or more nitrogen oxide(s) and reaction products thereof from the surface and/or from the pores of the at least one particulate earth alkali carbonate-comprising material and/or at least one particulate earth alkali phosphate-comprising material.

For example, washing step f) is carried out by contacting the at least one particulate earth alkali carbonate-comprising material and/or at least one particulate earth alkali phosphate-comprising material obtained in step c) or, if present step e), with water, an organic solvent, an aqueous solution of at least one basic reacting salt, preferably $Na_2CO_3$ or $Li_2CO_3$, or at least one base, preferably lithium hydroxide, sodium hydroxide, potassium hydroxide, calcium hydroxide, magnesium hydroxide, ammonia, ammonium hydroxide, organic amines, or mixtures thereof.

The organic solvent preferably comprises, more preferably consists of, a water-immiscible solvent. For example, the water-immiscible solvent may be selected from the group comprising toluene, benzene, diethyl ether, petroleum ether, dimethylsulphoxide and mixtures thereof. In one embodiment, the organic solvent comprises the water-immiscible solvent in an amount of at least 90.0 wt.-%, preferably at least 92.0 wt.-%, more preferably at least 94.0 wt.-%, even more preferably at least 96.0 wt.-% and most preferably at least 98.0 wt.-%, e.g. at least 99.0 wt.-%, based on the total weight of the organic solvent. For example, the organic solvent consists of the water-immiscible solvent.

Alternatively, the organic solvent is a water-miscible solvent. For example, the organic solvent may be selected from the group comprising methanol, ethanol, acetone and mixtures thereof.

In one embodiment, washing step f) is carried out by contacting the at least one particulate earth alkali carbonate-comprising material and/or at least one particulate earth alkali phosphate-comprising material obtained in step c) or, if present step e), with a mixture of water and an organic solvent. In this embodiment, the organic solvent may be selected from the group comprising methanol, ethanol, acetone, acetonitrile, tetrahydrofuran, toluene, benzene, diethyl ether, petroleum ether, dimethylsulphoxide and mixtures thereof. Preferably, the mixture of water and organic solvent comprises water in an amount of from 50.0 to 99.0 wt.-%, preferably from 60.0 to 98.0 wt.-%, more preferably from 70.0 to 97.0 wt.-%, based on the total weight of the mixture.

Additionally or alternatively, washing step f) is carried out by contacting the at least one particulate earth alkali carbonate-comprising material and/or at least one particulate earth alkali phosphate-comprising material obtained in step c) or, if present step e), with an aqueous solution of at least one basic reacting salt. Preferably, the aqueous solution of at least one basic reacting salt is an aqueous solution of $Na_2CO_3$ or $Li_2CO_3$. The aqueous solution of at least one basic reacting salt preferably comprises the at least one basic reacting salt in an amount ranging from 1 to 30 wt.-%, preferably from 2 to 20 wt.-%, based on the total weight of the aqueous solution. The aqueous solution of at least one basic reacting salt may also comprise an organic solvent, preferably in an amount of ≤10.0 wt.-%, preferably ≤8.0 wt.-%, more preferably ≤6.0 wt.-%, even more preferably ≤4.0 wt.-% and most preferably ≤2.0 wt.-%, based on the total weight of the aqueous solution.

Additionally or alternatively, washing step f) is carried out by contacting the at least one particulate earth alkali carbonate-comprising material and/or at least one particulate earth alkali phosphate-comprising material obtained in step c) or, if present step e), with an aqueous solution of at least one base.

The at least one base may be any base suitable for removing one or more nitrogen oxide(s) from the surface and/or from the pores of the at least one particulate earth alkali carbonate-comprising material and/or at least one particulate earth alkali phosphate-comprising material. In one embodiment, the at least one base is selected from the group comprising, preferably consisting of, lithium hydroxide, sodium hydroxide, potassium hydroxide, calcium hydroxide, magnesium hydroxide and mixtures thereof.

It is appreciated that the aqueous solution of at least one base preferably comprises the at least one base in an amount ranging from 0.01 to 99 wt.-%, preferably from 1 to 30 wt.-% and most preferably from 2 to 25 wt.-%, based on the total weight of the aqueous solution. The aqueous solution of at least one base may also comprise an organic solvent, preferably in an amount of ≤10.0 wt.-%, preferably ≤8.0 wt.-%, more preferably ≤6.0 wt.-%, even more preferably ≤4.0 wt.-% and most preferably ≤2.0 wt.-%, based on the total weight of the aqueous solution.

Preferably, the washing step f) is carried out by contacting the at least one particulate earth alkali carbonate-comprising material and/or at least one particulate earth alkali phosphate-comprising material obtained in step c), or if present step e), with water.

As already mentioned above, step f) is advantageous as the at least one particulate earth alkali carbonate-comprising material and/or at least one particulate earth alkali phosphate-comprising material obtained in step f) can be re-used as the at least one particulate earth alkali carbonate-comprising material and/or at least one particulate earth alkali phosphate-comprising material of step b).

It is thus appreciated that the at least one particulate earth alkali carbonate-comprising material and/or at least one particulate earth alkali phosphate-comprising material obtained in washing step f) can be re-used in process step b) as the at least one particulate earth alkali carbonate-comprising material and/or at least one particulate earth alkali phosphate-comprising material.

Thus, the process for taking up one or more nitrogen oxide(s) from a gaseous and/or aerosol or liquid medium may comprise a further step g) of re-using the at least one particulate earth alkali carbonate-comprising material and/or at least one particulate earth alkali phosphate-comprising material obtained in washing step f) in process step b) as the at least one particulate earth alkali carbonate-comprising material and/or at least one particulate earth alkali phosphate-comprising material.

In one preferred embodiment, the process for taking up one or more nitrogen oxide(s) from a gaseous and/or aerosol or liquid medium thus preferably comprises, more preferably consists of, the following steps:

a) providing a gaseous and/or aerosol or liquid medium comprising nitrogen oxides,
   b) providing at least one particulate earth alkali carbonate-comprising material and/or at least one particulate earth alkali phosphate-comprising material having a BET specific surface area as measured by the BET nitrogen method in the range from 10 to 200 m$^2$/g, and
   c) contacting the gaseous and/or aerosol or liquid medium of step a) with the at least one particulate earth alkali carbonate-comprising material and/or at least one particulate earth alkali phosphate-comprising material of step b) in any order, for taking up at least a part of the one or more nitrogen oxide(s) from the gaseous and/or aerosol or liquid medium onto the surface and/or into the pores of the at least one particulate earth alkali carbonate-comprising material and/or at least one particulate earth alkali phosphate-comprising material,
   d) optionally providing at least one particulate calcium carbonate-comprising material and contacting the at least one particulate calcium carbonate-comprising material with the at least one particulate earth alkali carbonate-comprising material and/or at least one particulate earth alkali phosphate-comprising material of step b) before and/or during and/or after step c),
   e) optionally exposing the at least one particulate earth alkali carbonate-comprising material and/or at least one particulate earth alkali phosphate-comprising material to UV and/or visible light during and/or after step c), and
   f) washing the at least one particulate earth alkali carbonate-comprising material and/or at least one particulate earth alkali phosphate-comprising material obtained in step c) or if present step e) in one or more steps such as to remove the one or more nitrogen oxide(s) and reaction products thereof from the surface and/or from the pores of the at least one particulate earth alkali carbonate-comprising material and/or at least one particulate earth alkali phosphate-comprising material.

Alternatively, the process for taking up one or more nitrogen oxide(s) from a gaseous and/or aerosol or liquid medium comprises, more preferably consists of, the following steps:

a) providing a gaseous and/or aerosol or liquid medium comprising nitrogen oxides, b) providing at least one particulate earth alkali carbonate-comprising material and/or at least one particulate earth alkali phosphate-comprising material having a BET specific surface area as measured by the BET nitrogen method in the range from 10 to 200 $m^2/g$, and c) contacting the gaseous and/or aerosol or liquid medium of step a) with the at least one particulate earth alkali carbonate-comprising material and/or at least one particulate earth alkali phosphate-comprising material of step b) in any order, for taking up at least a part of the one or more nitrogen oxide(s) from the gaseous and/or aerosol or liquid medium onto the surface and/or into the pores of the at least one particulate earth alkali carbonate-comprising material and/or at least one particulate earth alkali phosphate-comprising material, d) optionally providing at least one particulate calcium carbonate-comprising material and contacting the at least one particulate calcium carbonate-comprising material with the at least one particulate earth alkali carbonate-comprising material and/or at least one particulate earth alkali phosphate-comprising material of step b) before and/or during and/or after step c), e) optionally exposing the at least one particulate earth alkali carbonate-comprising material and/or at least one particulate earth alkali phosphate-comprising material to UV and/or visible light during and/or after step c), f) washing the at least one particulate earth alkali carbonate-comprising material and/or at least one particulate earth alkali phosphate-comprising material obtained in step c) or if present step e) in one or more steps such as to remove the one or more nitrogen oxide(s) and reaction products thereof from the surface and/or from the pores of the at least one particulate earth alkali carbonate-comprising material and/or at least one particulate earth alkali phosphate-comprising material, and g) re-using the at least one particulate earth alkali carbonate-comprising material and/or at least one particulate earth alkali phosphate-comprising material obtained in washing step f) in process step b) as the at least one particulate earth alkali carbonate-comprising material and/or at least one particulate earth alkali phosphate-comprising material.

The inventive process thus provides a number of improved properties. First of all, nitrogen oxides can be effectively adsorbed from a gaseous and/or aerosol or liquid medium, i.e. the process effectively decreases the amount of one or more nitrogen oxide(s) in a gaseous and/or aerosol or liquid medium. Furthermore, the process can be carried out with a material replacing or reducing the use of materials based on $TiO_2$. In addition thereto, the process allows for lowering the overall energy consumption and for increasing the efficiency, especially as regards time and the consumption of chemicals.

In view of the very good results obtained, the present invention refers in a further aspect to a particulate earth alkali carbonate-comprising material and/or particulate earth alkali phosphate-comprising material obtained by a process for taking up one or more nitrogen oxide(s) from a gaseous and/or aerosol or liquid medium as defined herein.

With regard to the definition of the process for taking up one or more nitrogen oxide(s) from a gaseous and/or aerosol or liquid medium and preferred embodiments thereof, reference is made to the statements provided above when discussing the technical details of the process of the present invention.

It is appreciated that the particulate earth alkali carbonate-comprising material and/or particulate earth alkali phosphate-comprising material is obtained by a process for taking up one or more nitrogen oxide(s) from a gaseous and/or aerosol or liquid medium comprising, more preferably consisting of, the following steps:

a) providing a gaseous and/or aerosol or liquid medium comprising nitrogen oxides, b) providing at least one particulate earth alkali carbonate-comprising material and/or at least one particulate earth alkali phosphate-comprising material having a BET specific surface area as measured by the BET nitrogen method in the range from 10 to 200 $m^2/g$, and c) contacting the gaseous and/or aerosol or liquid medium of step a) with the at least one particulate earth alkali carbonate-comprising material and/or at least one particulate earth alkali phosphate-comprising material of step b) in any order, for taking up at least a part of the one or more nitrogen oxide(s) from the gaseous and/or aerosol or liquid medium onto the surface and/or into the pores of the at least one particulate earth alkali carbonate-comprising material and/or at least one particulate earth alkali phosphate-comprising material, and d) optionally providing at least one particulate calcium carbonate-comprising material and contacting the at least one particulate calcium carbonate-comprising material with the at least one particulate earth alkali carbonate-comprising material and/or at least one particulate earth alkali phosphate-comprising material of step b) before and/or during and/or after step c).

Alternatively, the particulate earth alkali carbonate-comprising material and/or particulate earth alkali phosphate-comprising material is obtained by a process for taking up one or more nitrogen oxide(s) from a gaseous and/or aerosol or liquid medium comprising, more preferably consisting of, the steps of:

a) providing a gaseous and/or aerosol or liquid medium comprising nitrogen oxides, b) providing at least one particulate earth alkali carbonate-comprising material and/or at least one particulate earth alkali phosphate-comprising material having a BET specific surface area as measured by the BET nitrogen method in the range from 10 to 200 $m^2/g$, and c) contacting the gaseous and/or aerosol or liquid medium of step a) with the at least one particulate earth alkali carbonate-comprising material and/or at least one particulate earth alkali phosphate-comprising material of step b) in any order, for taking up at least a part of the one or more nitrogen oxide(s) from the gaseous and/or aerosol or liquid medium onto the surface and/or into the pores of the at least one particulate earth alkali carbonate-comprising material and/or at least one particulate earth alkali phosphate-comprising material, and d) optionally providing at least one particulate calcium carbonate-comprising material and contacting the at least one particulate calcium carbonate-comprising material with the at least one particulate earth alkali carbonate-comprising material and/or at least one particulate earth alkali phosphate-comprising material of step b) before and/or during and/or after step c), and e) exposing the at least one particulate earth alkali carbonate-comprising material and/or at least one particulate earth alkali phosphate-comprising material to UV and/or visible light during and/or after step c).

Thus, it is appreciated that the particulate earth alkali carbonate-comprising material and/or particulate earth alkali phosphate-comprising material obtained by a process for taking up one or more nitrogen oxide(s) from a gaseous and/or aerosol or liquid medium, as defined herein, comprises, preferably consists of, at least one particulate earth alkali carbonate-comprising material and/or at least one particulate earth alkali phosphate-comprising material and one or more nitrogen oxide(s) and/or reaction products thereof present on the surface and/or the pores of the at least one particulate earth alkali carbonate-comprising material and/or at least one particulate earth alkali phosphate-comprising material.

According to another aspect, the present invention refers to a particulate earth alkali carbonate-comprising material and/or particulate earth alkali phosphate-comprising material, wherein one or more nitrogen oxide(s) are taken up onto the surface and/or into the pores of the particulate earth alkali carbonate-comprising material and/or particulate earth alkali phosphate-comprising material.

With regard to the definition of the particulate earth alkali carbonate-comprising material and/or particulate earth alkali phosphate-comprising material, the nitrogen oxides and preferred embodiments thereof, reference is further made to the statements provided above when discussing the technical details of the process of the present invention.

According to a further aspect, the present invention refers to an adsorbing material comprising at least one particulate earth alkali carbonate-comprising material and/or at least one particulate earth alkali phosphate-comprising material.

In one embodiment, the adsorbing material is in form of a powder, granulated powder, aqueous suspension, column, cartridge, paint, coating, filter material, gabions, preferably gabions placed next to a motorway or a waste incineration plant, building material and the like.

In particular, it is appreciated that the adsorbing material is suitable for taking up one or more nitrogen oxide(s) from a gaseous and/or aerosol or liquid medium.

With regard to the definition of the particulate earth alkali carbonate-comprising material and/or particulate earth alkali phosphate-comprising material and preferred embodiments thereof, reference is further made to the statements provided above when discussing the technical details of the process of the present invention.

According to a still further aspect, the present invention refers to the use of at least one particulate earth alkali carbonate-comprising material and/or at least one particulate earth alkali phosphate-comprising material for taking up one or more nitrogen oxide(s) from a gaseous and/or aerosol or liquid medium.

Preferably, the gaseous and/or aerosol or liquid medium comprises nitrogen oxides selected from the group comprising $NO$, $NO_2$, $NO_2^-$, $NO_3^-$, $N_2O$, $N_4O$, $N_2O_3$, $N_2O_4$, $N_2O_5$, $N_4O_6$ and mixtures thereof.

In one embodiment, the at least one particulate earth alkali carbonate-comprising material and/or at least one particulate earth alkali phosphate-comprising material is in form of a powder, granulated powder, suspension, such as aqueous suspension or suspension in organic solvents, column, cartridge, paint, coating, filter material, gabions, preferably gabions placed next to a motorway or a waste incineration plant, building material, in admixture with solid materials differing from the at least one particulate earth alkali carbonate-comprising material and/or at least one particulate earth alkali phosphate-comprising material and the like.

With regard to the definition of the particulate earth alkali carbonate-comprising material and/or particulate earth alkali phosphate-comprising material and preferred embodiments thereof, reference is further made to the statements provided above when discussing the technical details of the process of the present invention.

The scope and interest of the invention may be better understood on basis of the following examples which are intended to illustrate embodiments of the present invention. However, they are not to be construed to limit the scope of the claims in any manner whatsoever.

EXAMPLES

1. Measurement Methods

In the following the measurement methods implemented in the examples are described.

Particle Size Distribution of a Particulate Material:

Volume based median particle size $d_{50}(vol)$ and the volume based top cut particle size $d_{98}(vol)$ was evaluated using a Malvern Mastersizer 2000 Laser Diffraction System (Malvern Instruments Plc., Great Britain). The $d_{50}(vol)$ or $d_{98}(vol)$ value indicates a diameter value such that 50% or 98% by volume, respectively, of the particles have a diameter of less than this value. The raw data obtained by the measurement was analysed using the Mie theory, with a particle refractive index of 1.57 and an absorption index of 0.005. The methods and instruments are known to the skilled person and are commonly used to determine particle size distributions of fillers and pigments.

The weight based median particle size $d_{50}(wt)$ was measured by the sedimentation method, which is an analysis of sedimentation behaviour in a gravimetric field. The measurement was made with a Sedigraph™ 5100 or 5120 of Micromeritics Instrument Corporation, USA. The method and the instrument are known to the skilled person and are commonly used to determine particle size distributions of fillers and pigments. The measurement was carried out in an aqueous solution of 0.1 wt.-% $Na_4P_2O_7$. The samples were dispersed using a high speed stirrer and sonicated.

Porosity/Pore Volume

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~nm). The equilibration time used at each pressure step is 20 seconds. The sample material is sealed in a 5 cm³ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p 1753-1764).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine interparticle packing of the particles themselves. If they also have intraparticle pores, then this region appears bi modal, and by taking the specific pore volume intruded by mercury into pores finer than the modal turning point, i.e. finer than the bi-modal point of inflection, define the specific intraparticle pore volume. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

pH of an Aqueous Suspension or Solution

The pH of a suspension or solution is measured at 25° C. using a Mettler Toledo Seven Easy pH meter and a Mettler Toledo InLab® Expert Pro pH electrode. It is appreciated that the temperature of 25° C. means 25° C.±2° C. A three point calibration (according to the segment method) of the instrument is first made using commercially available buffer solutions having pH values of 4, 7 and 10 at 20° C. (from Aldrich). The reported pH values are the endpoint values detected by the instrument (the endpoint is when the measured signal differs by less than 0.1 mV from the average over the last 6 seconds).

BET Specific Surface Area of a Particulate Material

Throughout the present document, the specific surface area (in $m^2/g$) of the particulate material is determined using the BET method (using nitrogen as adsorbing gas), which is well known to the skilled man (ISO 9277:2010). The total surface area (in $m^2$) of the particulate material is then obtained by multiplication of the specific surface area and the mass (in g) of the particulate material prior to treatment.

If the particulate material is a MCC, the specific surface area is measured via the BET method according to ISO 9277:2010 using nitrogen, following conditioning of the sample by heating at 250° C. for a period of 30 min. Prior to such measurements, the sample is filtered within a Buchner funnel, rinsed with deionised water and dried overnight at 90 to 100° C. in an oven. Subsequently the dry cake is ground thoroughly in a mortar and the resulting powder placed in a moisture balance at 130° C. until a constant weight is reached. The specific surface area is measured before any surface treatment. We assume that the surface treatment does not alter the BET surface area.

Solids Content

The suspension solids content (also known as "dry weight") was determined using a Moisture Analyser MJ33 from the company Mettler-Toledo, Switzerland, with the following settings: drying temperature of 150° C., automatic switch off if the mass does not change more than 1 mg over a period of 30 sec, standard drying of 5 to 20 g of suspension.

Moisture Content (Humidity)

A 10 g powder sample has been heated in an oven at 150° C. until the mass is constant for at least 1 hour. The mass loss has been expressed as wt.-% loss based on the initial sample mass. This mass loss has been attributed to the sample humidity.

Ion Chromatography

Cations and anions were measured by ionic chromatography (882 Compact IC plus, Metrohm). Anion mobile phase: 1.0 mmol/L $NaHCO_3$ and 3.2 mmol/L $Na_2CO_3$. Flow of 0.7 mL/min.

Cation mobile phase: 1.7 mmol/L $HNO_3$ and 0.7 mmol/L DPA. Flow 0.9 mL/min. The different ions are measured using a conductivity detector.

2. Examples $NO_x$ Gas

Synthetic air containing nitrogen dioxide was provided by Pan Gas AG (Switzerland). The indicated analytical value is 10 ppm nitrogen dioxide (uncertainty +/−10%).

Surface-Modified Calcium Carbonate:

a) Surface-Modified Calcium Carbonate 1 (MCC1):

MCC 1 had a $d_{50}(vol)$=7.1 μm, $d_{98}(vol)$=13.65 μm, $d_{98}(vol)/d_{50}(vol)$=1.9, SSA=66.0 $m^2/g$ with an intra-particle intruded specific pore volume of 1.018 $cm^3/g$ (for the pore diameter range of 0.004 to 0.51 μm) and humidity=1.5%.

MCC 1 was obtained by preparing 8 litres of an aqueous suspension of ground calcium carbonate in a mixing vessel by adjusting the solids content of a ground limestone calcium carbonate from Orgon, France, having a weight based median particle size of 1.2 μm, as determined by sedimentation, such that a solids content of 10 wt.-%, based on the total weight of the aqueous suspension, is obtained.

Whilst mixing the slurry, 0.3 kg phosphoric acid was added in form of an aqueous solution containing 30 wt.-% phosphoric acid to said suspension over a period of 10 minutes at a temperature of 70° C. Finally, after the addition of the phosphoric acid, the slurry was stirred for additional 5 minutes, before removing it from the vessel and drying.

pH (10 wt % suspension in deionised water)=7.9 b) Surface-Modified Calcium Carbonate 2 (MCC 2):

MCC 2 had a $d_{50}(vol)$=6.6 μm, $d_{98}(vol)$=15.1 μm, $d_{98}(vol)/d_{50}(vol)$=2.29, SSA=144 $m^2/g$ with an intra-particle intruded specific pore volume of 0.811 $cm^3/g$ (for the pore diameter range of 0.004 to 0.23 μm) and humidity=6.77 wt.-%.

MCC 2 was obtained by preparing 450 litres of an aqueous suspension of ground calcium carbonate in a mixing vessel by adjusting the solids content of a ground marble calcium carbonate from Hustadmarmor, Norway, having weight based median particle size distribution of 90% less than 2 μm, as determined by sedimentation, such that a solids content of 16 wt.-%, based on the total weight of the aqueous suspension, is obtained.

Whilst mixing the slurry, 47.1 kg phosphoric acid was added in form of an aqueous solution containing 30 wt.-% phosphoric acid to said suspension over a period of 15 minutes at a temperature of 70° C. After the addition of the acid, the slurry was stirred for additional 5 minutes, before removing it from the vessel and drying.

pH (10 wt.-% suspension in deionised water)=7.5 c) Surface-Modified Calcium Carbonate 3 (MCC 3):

MCC 3 has a $d_{50}(vol)$=6.9 μm, $d_{98}(vol)$=24.4 μm, $d_{98}(vol)/d_{50}(vol)$=3.5, SSA=26 $m^2/g$ with an intra-particle intruded specific pore volume of 0.449 $cm^3/g$ (for the pore diameter range of 0.004 to 0.32 μm) and humidity=1 wt.-%. pH (10 wt % suspension in deionised water)=8.4.

MCC 3 was obtained by preparing 1 000 litres of an aqueous suspension of ground calcium carbonate in a mixing vessel by adjusting the solids content of a ground marble calcium carbonate from Hustadmarmor, Norway, having a $d_{50}$(wt.) of 1.7 μm and a $d_{98}$(wt.) of 5 μm, as determined by sedimentation, such that a solids content of 20 wt.-%, based on the total weight of the aqueous suspension, is obtained. Whilst mixing the slurry, 46 kg phosphoric acid was added in form of an aqueous solution containing 30 wt.-% phosphoric acid to said suspension over a period of 30 minutes at a temperature of 70° C. After the addition of the acid, the slurry was stirred for additional 5 minutes, before removing it from the vessel and drying.

Example 1: $NO_x$ Adsorption from Ambient Air 100 g of modified calcium carbonate 1 was homogeneously distributed over the surface of an aluminium dish (24×17 cm). The material was stored open inside the laboratory bench over several weeks. After the certain period 5 grams of the material were removed and mixed at room temperature with 30 g of deionized water (MiliQ water; resistivity 18 M$\Phi$cm; TOC<3 ppb) and shaken for 10 minutes. The suspension was filtrated and analysed by ion chromatography as described hereafter, The results are shown in the table 1 below:

TABLE 1

| Modified calcium carbonate 1 | | |
|---|---|---|
| Time [hours] | $NO_2^-$ [mg/kg dry material] | $NO_3^-$ [mg/kg dry material] |
| 0 | 2.64 | 7.51 |
| 65 | 5.63 | 7.78 |
| 90 | 6.78 | 8.07 |
| 120 | 7.99 | 7.87 |
| 287 | 15.15 | 10.02 |
| 431 | 18.89 | 10.05 |
| 931 | 32.99 | 13.44 |
| 1 412 | 42.61 | 22.99 |
| 2 108 | 62.17 | 40.93 |
| 3 260 | 71.73 | 86.94 |

Example 2

Adsorption of Concentrated Artificial $NO_x$ Gas:

5 grams of modified calcium carbonate 1 were put in an Erlenmeyer. $NO_x$ gas of 10 ppm was flowed using a wash bottle system over the sample for 1 minute. 30 g of water were added and the solution was shaken. The solution was then filtrated and analysed by IC.

The results are outlined in table 2 below.

TABLE 2

| $NO_2^-$ [mg/kg dry material] | | $NO_3^-$ [mg/kg dry material] | |
|---|---|---|---|
| Before contact with artificial air | After contact with artificial air | Before contact with artificial air | After contact with artificial air |
| 2.5 | 5.0 | 7.5 | 10.0 |

Example 3

Experimental Setup

The experimental set-up is outlined in FIG. 1 below.

A drying tube Scienceware® (Sigma Aldrich, Ref. Z118559-12EA) was used as a gas column and filled at both ends with around 1 cm of glass wool (Supelco, Ref 2-0384). The column was closed at one end with the corresponding tip. The sample was added in the column. The other end of the column was closed with another identical tip, both having a gas inlet.

The column was then connected to a $NO_x$ gas bottle (10 ppm $NO_x$ gas in artificial air) and on the other side to a recipient containing a Drager $NO_x$ gas detector. Finally, this recipient was connected to a flowmeter in order to know the flow of gas going through the column.

The gas was flowed through the column over 26 hours at around 200 mL/min. The $NO_x$ amount was measured by the Drager instrument and manually recorded over time. Measurements were performed at room temperature (23+/−2° C.).

Gas flowmeter: FlowMark™, Perkin Elmer, Part N9307086, Serial N° PE200904. Measuring range 0-600 mL/min.

Drager $NO_x$ gas detector: Drager PAC 7000 $NO_2$ (ref 8318977, Serial No ARHA-2302). Measuring range 0-50 ppm.

Trial 3A Reference (Column with Glass Wool)

The filter column was filled with loosely packed glass wool $NO_x$ containing gas was passed through with a flow rate as indicated in table 3 below. After a few minutes the measured $NO_x$ concentration at the outlet of the filter column was 6.3 ppm which corresponds to the concentration in the original $NO_x$ containing gas. This shows that no $NO_x$ is adsorbed by the glass wool packed filter column.

Trial 3B (Column with 5 g of MCC1+$NO_x$ Gas)

The filter column was filled with MCC1. 5 g of loosely packed powder filled the whole column. Glass wool was put on the inlet and outlet of the column in order to avoid that the powder material was flowing out of the cartridge.

The $NO_x$ containing gas was passed through with a flow rate as indicated in table 3 below. The measured $NO_x$ values are reported below. This example illustrates the removal of $NO_x$ out of the gas stream.

Trial 3C (Column with 5 g of MCC2+$NO_x$ Gas

The filter column was filled with MCC2. 5 g of loosely packed powder filled the whole column. Glass wool was put on the inlet and outlet of the column in order to avoid that the powder material was flowing out of the cartridge.

The $NO_x$ containing gas was passed through with a flow rate as indicated in Table 3 below. The measured $NO_x$ values are reported below. This example illustrates the removal of $NO_x$ out of the gas stream.

TABLE 3

| | Trial 3A | | Trial 3B | | Trial 3C | |
|---|---|---|---|---|---|---|
| Time [hours] | Air flow [mL/min] (1) | $NO_x$ [ppm] (2) | $NO_x$ [ppm] (1) | Air flow [mL/min] (2) | $NO_x$ [ppm] (1) | Air flow [mL/min] (2) |
| 0.00 | 200.0 | 0.0 | 0.0 | 200.0 | 0.0 | 198.0 |
| 0.02 | | 1.2 | 0.0 | 199.0 | 0.0 | 226.0 |
| 0.03 | 198.0 | 2.3 | 0.0 | 194.0 | 0.0 | 211.0 |
| 0.05 | | 3.3 | 0.0 | 200.0 | 0.0 | 200.0 |
| 0.07 | | 4.2 | 0.0 | 200.0 | 0.0 | 212.0 |
| 0.08 | 201.0 | 4.7 | 0.2 | 196.0 | 0.3 | 208.0 |

TABLE 3-continued

| | Trial 3A | | Trial 3B | | Trial 3C | |
|---|---|---|---|---|---|---|
| Time [hours] | Air flow [mL/min] (1) | NO$_x$ [ppm] (2) | NO$_x$ [ppm] (1) | Air flow [mL/min] (2) | NO$_x$ [ppm] (1) | Air flow [mL/min] (2) |
| 0.17 | | 5.9 | 0.4 | 206.0 | 0.4 | 207.0 |
| 0.25 | | 6.2 | 0.4 | 199.0 | 0.4 | 205.0 |
| 0.5 | 202.0 | 6.3 | 0.5 | 192.0 | 0.4 | 208.0 |
| 1.0 | | 6.3 | 0.5 | 192.0 | 0.4 | 197.0 |
| 2.0 | 200.0 | 6.3 | 0.4 | 179.0 | 0.4 | 200.0 |
| 3.0 | | | 0.4 | 203.0 | | |
| 3.6 | | | | | 0.5 | 255.0 |
| 4.0 | | | 0.5 | 194.0 | 0.4 | 200.0 |
| 5.0 | | | 0.4 | 194.0 | 0.4 | 220.0 |
| 6.0 | | | | | 0.3 | 185.0 |
| 7.0 | | | | | 0.4 | 214.0 |
| 20.0 | | | | | | |
| 21.0 | | | 0.4 | 225.0 | | |
| 22.0 | | | 0.5 | 240.0 | | |
| 23.0 | | | 0.4 | 206.0 | 0.3 | 199.0 |
| 24.0 | | | 0.4 | 210.0 | 0.3 | 206.0 |
| 25.0 | | | 0.4 | 221.0 | 0.3 | 218.0 |
| 26.0 | | | 0.4 | 215.0 | 0.4 | 225.0 |

The invention claimed is:

1. A process for taking up one or more nitrogen oxide(s) from a gaseous or aerosol or liquid medium, the process comprising the following steps:
   a) providing a gaseous or aerosol or liquid medium comprising one or more nitrogen oxide(s),
   b) providing at least one particulate earth alkali carbonate-comprising material and/or at least one particulate earth alkali phosphate-comprising material having a BET specific surface area as measured by the BET nitrogen method in the range from 10 to 200 m$^2$/g, and
   c) contacting the gaseous and/or aerosol or liquid medium of step a) with the at least one particulate earth alkali carbonate-comprising material and/or at least one particulate earth alkali phosphate-comprising material of step b) for taking up at least a part of the one/or more nitrogen oxide(s) from the gaseous and/or aerosol or liquid medium onto the surface and/or into the pores of the at least one particulate earth alkali carbonate-comprising material and/or at least one particulate earth alkali phosphate-comprising material, and
   d) optionally providing at least one particulate calcium carbonate-comprising material and contacting the at least one particulate calcium carbonate-comprising material with the at least one particulate earth alkali carbonate-comprising material and/or at least one particulate earth alkali phosphate-comprising material of step b) before and/or during and/or after step c);
   wherein the at least one particulate earth alkali carbonate-comprising material and/or at least one particulate earth alkali phosphate-comprising material of step b) is surface-modified calcium carbonate, or surface-modified calcium carbonate in admixture with apatite, magnesium carbonate, hydromagnesite and/or dolomite.

2. The process according to claim 1, wherein the medium of step a) is a gaseous and/or aerosol medium selected from the group comprising air, ambient air, exhaust fumes, factory fumes, household fumes, industrial fumes, vehicle exhausts, fog, smoke and mixtures thereof, or the medium of step a) is a liquid medium selected from the group comprising rain water, drinking water, industrial waste water, urban waste water, agricultural waste water and mixtures thereof.

3. The process according to claim 1, wherein the gaseous and/or aerosol or liquid medium comprises one or more nitrogen oxide(s) selected from the group comprising NO, NO$_2$, NO$_2^-$, NO$_3^-$, N$_2$O, N$_4$O, N$_2$O$_3$, N$_2$O$_4$, N$_2$O$_5$, N$_4$O$_6$, and mixtures thereof.

4. The process according to claim 1, wherein the gaseous and/or aerosol or liquid medium comprises the one or more nitrogen oxide(s) in a total amount of up to 1500 ppm, based on the total volume of the gaseous and/or aerosol or liquid medium.

5. The process according to claim 1, wherein the at least one particulate earth alkali carbonate-comprising material and/or at least one particulate earth alkali phosphate-comprising material of step b) and/or the at least one particulate calcium carbonate-comprising material of step d) is provided in form of a powder, granulated powder, suspension, such as aqueous suspension or suspension in organic solvents, column, cartridge, paint, coating, filter material, gabions, building material, in admixture with solid materials differing from the at least one particulate earth alkali carbonate-comprising material and/or at least one particulate earth alkali phosphate-comprising material of step b) and/or the at least one particulate calcium carbonate material of step d), mica, clay, talc and the like.

6. The process according to claim 1, wherein the at least one particulate calcium carbonate-comprising material of step d) is at least one natural ground calcium carbonate (NGCC), and/or at least one precipitated calcium carbonate (PCC) having
   i) a volume median particle size d$_{50}$ of <30 mm, determined by the light scattering method, and/or
   ii) a BET specific surface area as measured by the BET nitrogen method in the range of 0.5 to 200 m$^2$/g, and/or
   iii) a particle size distribution d$_{98}$/d$_{50}$ of ≥2, determined by the light scattering method.

7. The process according to claim 1, wherein the at least one particulate earth alkali carbonate-comprising material and/or at least one particulate earth alkali phosphate-comprising material of step b) is at least one surface-modified calcium carbonate (MCC) having
   i) a volume median particle size d$_{50}$ of ≥1 µm, determined by the light scattering method, and/or
   ii) a BET specific surface area as measured by the BET nitrogen method in the range of 15 to 200 m$^2$/g, and/or
   iii) a particle size distribution d$_{98}$/d$_{50}$ of ≥1.1, and/or
   iv) an intra-particle intruded specific pore volume in the range of 0.150 to 1.300 cm$^3$/g, calculated from a mercury intrusion porosimetry measurement.

8. The process according to claim 1, wherein the at least one particulate calcium carbonate-comprising material of step d) and/or the at least one particulate earth alkali carbonate-comprising material and/or at least one particulate earth alkali phosphate-comprising material of step b) has/have a moisture content of at least 0.001 mg/m$^2$.

9. The process according to claim 1, wherein the process comprises a further step e) of exposing the at least one particulate earth alkali carbonate-comprising material and/or at least one particulate earth alkali phosphate-comprising material to UV and/or visible light during and/or after step c).

10. The process according to claim 1, wherein the process comprises a further step f) of washing the at least one particulate earth alkali carbonate-comprising material and/or at least one particulate earth alkali phosphate-comprising material obtained in step c) or if present step e) in one or more steps such as to remove the one or more nitrogen oxide(s) and/or reaction products thereof from the surface and/or from the pores of the at least one particulate earth alkali carbonate-comprising material and/or at least one particulate earth alkali phosphate-comprising material.

11. The process according to claim 10, wherein the washing step f) is carried out by contacting the at least one particulate earth alkali carbonate-comprising material and/or at least one particulate earth alkali phosphate-comprising material obtained in step c) or if present step e) with water, an organic solvent, an aqueous solution of at least one basic reacting salt, or at least one base.

12. The process according to claim 11, wherein the at least one basic reacting salt is Na2CO3 or Li2CO3.

13. The process according to claim 10, wherein the at least one particulate earth alkali carbonate-comprising material and/or at least one particulate earth alkali phosphate-comprising material obtained in washing step f) is reused in process step b) as the at least one particulate earth alkali carbonate-comprising material and/or at least one particulate earth alkali phosphate-comprising material.

14. The process according to claim 11, wherein the at least one base is lithium hydroxide, sodium hydroxide, potassium hydroxide, calcium hydroxide, magnesium hydroxide, ammonia, ammonium hydroxide, organic amines or mixtures thereof.

15. The process according to claim 1, wherein the gaseous and/or aerosol or liquid medium comprises the one or more nitrogen oxide(s) in a total amount of up to 700 ppm, based on the total volume of the gaseous and/or aerosol or liquid medium.

16. The process according to claim 1, wherein the gaseous and/or aerosol or liquid medium comprises the one or more nitrogen oxide(s) in a total amount of ranging from 1 to 600 ppm, based on the total volume of the gaseous and/or aerosol or liquid medium.

17. The process according to claim 1, wherein the at least one particulate calcium carbonate-comprising material of step d) is at least one natural ground calcium carbonate (NGCC), and/or at least one precipitated calcium carbonate (PCC) having
  i) a volume median particle size $d_{50}$ in the range of 60 nm to 400 μm, determined by the light scattering method, and/or
  ii) a BET specific surface area as measured by the BET nitrogen method in the range of 25 to 100 m$^2$/g, and/or
  iii) a particle size distribution $d_{98}/d_{50}$ in the range of 3.2 to 5.5, determined by the light scattering method.

18. The process according to claim 1, wherein the at least one particulate calcium carbonate-comprising material of step d) is at least one natural ground calcium carbonate (NGCC), and/or at least one precipitated calcium carbonate (PCC) having
  i) a volume median particle size $d_{50}$ in the range of 40 nm to 2000 μm, determined by the light scattering method, and/or
  ii) a BET specific surface area as measured by the BET nitrogen method in the range of 15 to 175 m$^2$/g, and/or
  iii) a particle size distribution $d_{98}/d_{50}$ of ≥3, determined by the light scattering method.

19. The process according to claim 1, wherein the at least one particulate earth alkali carbonate-comprising material and/or at least one particulate earth alkali phosphate-comprising material of step b) is at least one surface-modified calcium carbonate (MCC) having
  i) a volume median particle size $d_{50}$ in the range of 1.5 μm to 20 μm, determined by the light scattering method, and/or
  ii) a BET specific surface area as measured by the BET nitrogen method of from 30 to 160 m$^2$/g, and/or
  iii) a particle size distribution $d_{98}/d_{50}$ in the range of 1.5 to 3, determined by the light scattering method, and/or
  iv) an intra-particle intruded specific pore volume in the range of 0.178 to 1.244 cm$^3$/g, calculated from a mercury intrusion porosimetry measurement.

20. The process according to claim 1, wherein the at least one particulate earth alkali carbonate-comprising material and/or at least one particulate earth alkali phosphate-comprising material of step b) is at least one surface-modified calcium carbonate (MCC) having
  i) a volume median particle size $d_{50}$ in the range of 1 μm to 100 μm, determined by the light scattering method, and/or
  ii) a BET specific surface area as measured by the BET nitrogen method in the range of 15 to 200 m$^2$/g, and/or
  iii) a particle size distribution $d_{98}/d_{50}$ of ≥1.3, determined by the light scattering method, and/or
  iv) an intra-particle intruded specific pore volume in the range of 0.150 to 1.300 cm$^3$/g, calculated from a mercury intrusion porosimetry measurement.

* * * * *

UNITED STATES PATENT AND TRADEMARK OFFICE
CERTIFICATE OF CORRECTION

PATENT NO. : 10,717,042 B2
APPLICATION NO. : 16/071389
DATED : July 21, 2020
INVENTOR(S) : Laporte et al.

Page 1 of 1

It is certified that error appears in the above-identified patent and that said Letters Patent is hereby corrected as shown below:

On the Title Page

In the Foreign Application Priority Data item (30): Insert -- Mar. 7, 2016, EP 16158979.1 --

Signed and Sealed this
Eighth Day of September, 2020

Andrei Iancu
*Director of the United States Patent and Trademark Office*